United States Patent
Koo et al.

(10) Patent No.: US 8,780,829 B2
(45) Date of Patent: Jul. 15, 2014

(54) METHOD FOR TRANSMITTING AND RECEIVING A COMP REFERENCE SIGNAL IN A MULTI-CELL ENVIRONMENT

(75) Inventors: Ja Ho Koo, Gyeonggi-do (KR); Yeong Hyeon Kwon, Gyeonggi-do (KR); Su Nam Kim, Gyeonggi-do (KR); Jae Hoon Chung, Gyeonggi-do (KR); Moon Il Lee, Gyeonggi-do (KR); Hyun Soo Ko, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 226 days.

(21) Appl. No.: 13/132,736

(22) PCT Filed: Nov. 10, 2009

(86) PCT No.: PCT/KR2009/006592
§ 371 (c)(1),
(2), (4) Date: Jun. 3, 2011

(87) PCT Pub. No.: WO2010/064794
PCT Pub. Date: Jun. 10, 2010

(65) Prior Publication Data
US 2011/0235608 A1    Sep. 29, 2011

(30) Foreign Application Priority Data

May 14, 2009 (KR) .................. 10-2009-0042026

(51) Int. Cl.
*H04W 4/00* (2009.01)
*H04W 72/04* (2009.01)
*H04W 28/04* (2009.01)

(52) U.S. Cl.
CPC ............ *H04W 72/048* (2013.01); *H04W 28/04* (2013.01)
USPC ............................ 370/329; 370/328; 370/330

(58) Field of Classification Search
None
See application file for complete search history.

(56) References Cited

U.S. PATENT DOCUMENTS

| | | | |
|---|---|---|---|
| 2007/0248113 A1* | 10/2007 | Ko et al. ...................... | 370/436 |
| 2008/0260062 A1 | 10/2008 | Imamura | |
| 2009/0040919 A1* | 2/2009 | Muharemovic et al. ...... | 370/210 |
| 2010/0040159 A1* | 2/2010 | Lee et al. ..................... | 375/260 |

FOREIGN PATENT DOCUMENTS

| | | |
|---|---|---|
| EP | 1 001 558 | 5/2000 |
| KR | 2000-0047620 | 7/2000 |
| KR | 2008-0056423 | 6/2008 |

OTHER PUBLICATIONS

3GPP TSG RAN WG1, ZTE, Consideration on COMP antenna port mapping in LTE-A, Sep. 29-Oct. 3, 2008.*
International Search Report from PCT/KR2009/006592 (PCT corresponding to present application).

* cited by examiner

*Primary Examiner* — Kevin C Harper
*Assistant Examiner* — Peter Chen
(74) *Attorney, Agent, or Firm* — Morgan, Lewis & Bockius LLP

(57) ABSTRACT

Disclosed is a channel estimation method using a cooperative multi-point (CoMP) reference signal in a multi-cell environment. The method comprises a CoMP reference signal receiving step of enabling a terminal to receive, from each of the cells that perform a CoMP operation, a CoMP reference signal where an orthogonal code is applied to each of the cells; a channel estimation step of enabling the terminal to estimate, using said CoMP reference signal, channels of each of the cells which perform said CoMP operation; and a channel status feedback information transmitting step of enabling the terminal to transmit channel status feedback information to each of the cells.

8 Claims, 15 Drawing Sheets

METHOD FOR TRANSMITTING AND RECEIVING A COMP REFERENCE SIGNAL IN A MULTI-CELL ENVIRONMENT

TECHNICAL FIELD

The present invention relates to a method for transmitting and receiving a reference signal and more particularly, to a method for transmitting and receiving a CoMP (Cooperative Multi-Point) reference signal from each of cells that perform a CoMP operation in a multi-cell environment.

BACKGROUND ART

Multiple Input Multiple Output (MIMO) has recently attracted much attention as a broadband wireless mobile communication technology. A MIMO system increases data communication efficiency using a plurality of antennas. The MIMO system can be implemented in a MIMO scheme such as spatial multiplexing or spatial diversity depending on whether the same data is transmitted or not.

In spatial multiplexing, different data is transmitted simultaneously through a plurality of transmission antennas, thereby enabling high-speed data transmission without increasing a system bandwidth. Spatial diversity is a scheme that achieves transmit diversity by transmitting the same data through a plurality of transmission antennas. Space time channel coding is an example of spatial diversity.

In addition, MIMO schemes may be categorized into open-loop MIMO schemes and closed-loop MIMO schemes depending on whether a receiver feeds back channel information to a transmitter. The open-loop MIMO schemes include BLAST that can increase the amount of information as much as the number of transmission antennas by transmitting information in parallel from a transmitter and detecting a signal by repeating ZF (Zero Forcing) or MMSE (Minimum Mean Square Error) detection at a receiver and STTC (Space-Time Trellis Code) that can achieve transmit diversity and a coding gain by using a new spatial region. TxAA (Transmit Antenna Array) is a closed-loop MIMO scheme.

In a radio channel environment, a channel state changes irregularly in the time and frequency domains, which is called fading. Thus, a receiver corrects a received signal using channel information to recover data transmitted by a transmitter and detect a correct signal.

In a wireless communication system, a transmitter transmits to a receiver a signal known to both the transmitter and the receiver so that channel information is detected based on distortion that the signal has experienced during transmission on a channel. This signal is called a reference signal (or a pilot signal) and channel information detection is called channel estimation. The reference signal is transmitted with high power, without carrying actual data. When data is transmitted and received through a plurality of antennas, the channel state between each transmission antenna and each reception antenna should be determined and thus a reference signal exists for each transmission antenna.

A cooperative MIMO system was proposed to reduce inter-cell interference in a multi-cell environment. In the cooperative MIMO system, multi-cell Base Stations (BSs) can jointly support data for a UE. The BSs may also support one or more UEs, MS1, MS2, . . . , MSK simultaneously in the same frequency resources to increase system performance. Further, the BSs may perform Space Division Multiple Access (SDMA) based on channel state information between the BSs and a UE.

A serving BS and one or more cooperative BSs are connected to a scheduler through a backbone network in the cooperative MIMO system. The scheduler may operate based on feedback channel information about the channel states between the UEs, MS1, MS2, . . . , MSK and the cooperative BSs, measured at the BSs, BS1, BS2, . . . , BSM, received through the backbone network. For example, the scheduler schedules information required for a cooperative MIMO operation for the serving BS and the one or more cooperative BSs. That is, the scheduler directly issues commands regarding a cooperative MIMO operation to each BS.

CoMP was proposed to reduce inter-cell interference and improve the performance of UEs at a cell edge in the multi-cell environment. That is, a CoMP system can improve the communication performance of cell-edge UEs in the multi-cell environment. For this purpose, there is a need for accurate channel estimation based on reference signals received from multi-cell BSs.

However, as more cells perform a CoMP operation, conventional CoMP reference signals have the shortcoming that a PN (Pseudo Noise) code is shortened within one resource block and lack of dispreading samples during channel estimation degrades channel estimation performance. Therefore, a new CoMP reference signal pattern is required to guarantee accurate estimation of channels from neighbor cells for a UE performing a CoMP operation.

Moreover, no CoMP reference signals have been defined so far for LTE-A (Long Term Revolution-Advanced).

DISCLOSURE

Technical Problem

An object of the present invention devised to solve the conventional problem is to provide a method for receiving CoMP reference signals at a UE in a multi-cell environment.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for receiving a CoMP RS (Cooperative Multi-Point Reference Signal) from each of CoMP cells at a user equipment (UE) in a multi-cell environment includes receiving from the CoMP cells CoMP RSs to which orthogonal codes are applied on a slot unit or on a symbol unit, for mutual orthogonality among the CoMP RSs, and processing the received CoMP RSs using the orthogonal codes applied on a slot unit or on a symbol unit by distinguishing the CoMP cells from one another.

In another aspect of the present invention, a method for transmitting a CoMP RS (Cooperative Multi-Point Reference Signal) at a CoMP base station in a multi-cell environment includes allocating orthogonal code resources to which an orthogonal code is applied on a slot unit or on a symbol unit, for mutual orthogonality among CoMP reference signals of the CoMP base stations, and transmitting a CoMP reference signal using the orthogonal code resources to which the orthogonal code is applied on a slot unit or on a symbol unit, for mutual orthogonality among the CoMP reference signals of the CoMP base stations.

Advantageous Effects

The CoMP reference signal reception method according to the present invention has several benefits.

Firstly, a UE can perform channel estimation with increased accuracy by demodulating a CoMP reference signal received from each cell.

Secondly, the communication performance of a cell-edge UE can be improved by CoMP in a multi-cell environment.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
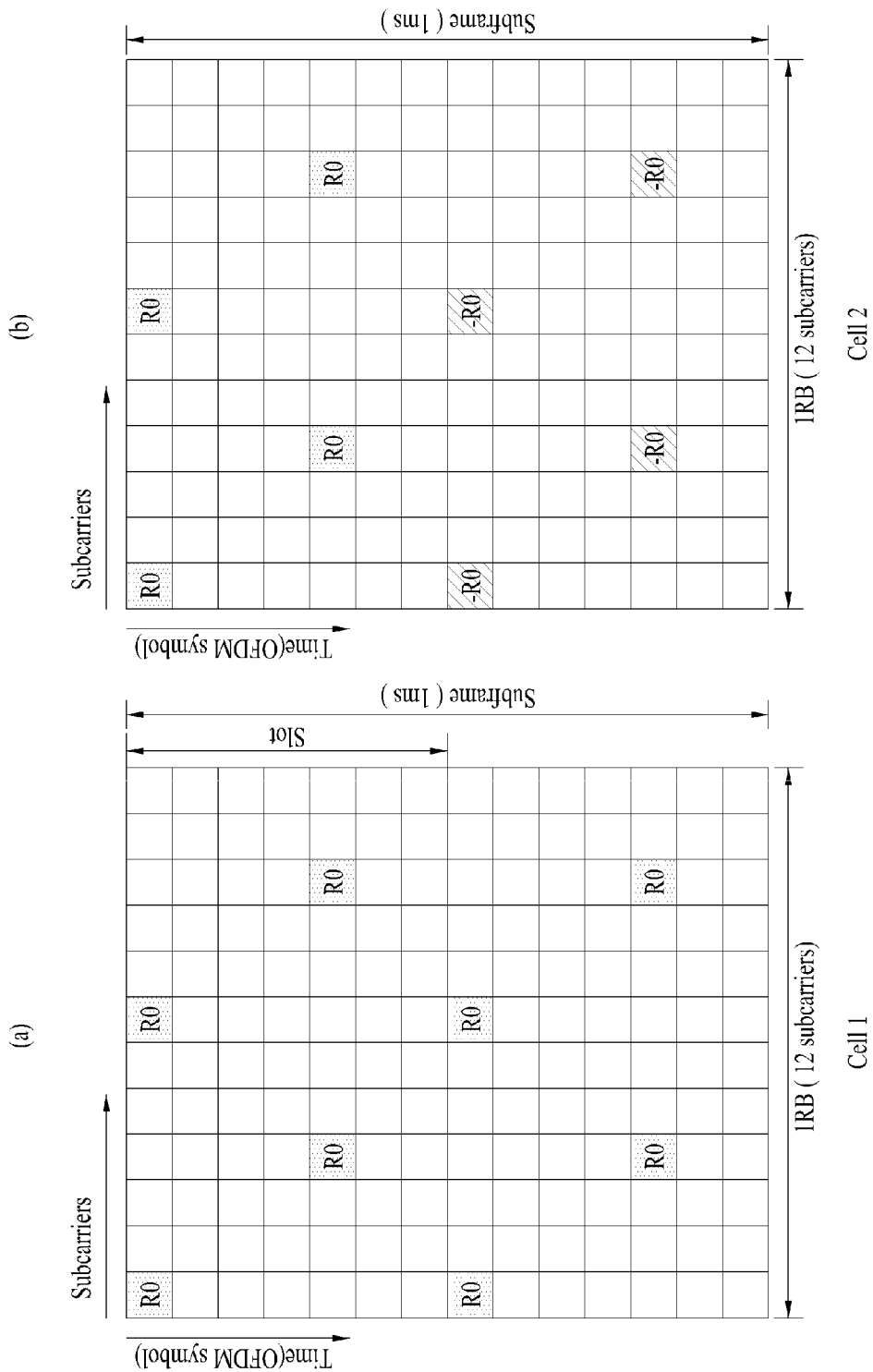
FIG. 1 illustrates exemplary reference signal patterns of allocating reference signals using code resources on a slot basis in two cells.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. For example, while the following detailed description includes specific details in order to provide a thorough understanding of the present invention, it will be apparent to those skilled in the art that the present invention may be practiced without such specific details. For example, the following description is given, centering on specific terms, which should not be construed as limiting the present invention. Even though a specific term is replaced with an arbitrary term, they are interchangeably used in the same meaning. The same reference numbers will be used throughout this specification to refer to the same or like parts.

Through the specification, when it is said that some part "includes" a specific element, this means that the part may further include other elements, not excluding them, unless otherwise mentioned.

To enable a receiver to effectively perform channel estimation, the following conditions need to be satisfied in allocating Reference Signals (RSs) to be transmitted through transmission antennas.

Firstly, since the receiver uses RSs for channel estimation, the RSs should be allocated in such a manner that the receiver can distinguish RSs transmitted through transmission antennas. The RSs for the respective antennas are allocated not to be overlapped in the time and/or frequency domain so that the receiver can distinguish the RSs from one another. Even though the RSs are allocated overlapped in the time and/or frequency domain, they should be orthogonal in the code domain. For this purpose, the RSs may use orthogonal codes having excellent auto-correlation or cross-correlation characteristics, for example, Constant Amplitude Zero AutoCorrelation (CAZAC) codes, Walsh codes, etc.

Secondly, it is preferred that an region in which an RS is located does not experience a channel change, if possible. When a channel changes much in the allocation region of an RS, a large channel estimation error is likely to occur. Data around the RS is decoded using a channel in the region of the RS.

A frame may be divided into a plurality of subframes, each subframe including a plurality of OFDM symbols in the time domain by a plurality of subcarriers in the frequency domain. For example, one subframe may have 14 or 28 OFDM symbols. If one subframe includes 14 OFDM symbols, the 14 OFDM symbols may be represented respectively as a first OFDM symbol, a second OFDM symbol, . . . , a $14^{th}$ OFDM symbol of a Transmission Time Interval (TTI) along the time axis.

A subframe corresponds to one resource grid defined for each transmission antenna. The TTI may be defined as a time period during which one subframe is transmitted. Each element on the resource grid of a subframe is a resource element. For example, resource element (k, l) corresponds to a resource element at an $l^{th}$ subcarrier in a $k^{th}$ OFDM symbol.

In this Resource Block (RB), an RS may be allocated across a total band or in a partial band. Compared to RS allocation in a partial band, the density of an RS increases and thus high channel estimation performance can be achieved in RS allocation across a total band. However, if RS allocation is confined to a partial band, a high data rate can be achieved, but a low density of the RS may lead to a degraded channel estimation performance.

A Coordinated Multi-Point (CoMP) system was designed to increase the throughput of cell-edge users through improved MIMO transmission in a multi-cell environment. A CoMP system can reduce inter-cell interference in the multi-cell environment. In the CoMP system, multi-cell BSs (Base Stations) can jointly support data for a UE. The BSs may also support one or more UEs, MS1, MS2, . . . , MSK simultaneously in the same frequency resources to increase system performance. Further, the BSs may perform Space Division Multiple Access (SDMA) based on channel state information between the BSs and a UE.

A description will be given below of a method for increasing the performance of estimating channels received from multi-cell BSs in a cooperative MIMO system that can minimize inter-cell interference in a multi-cell environment. Especially, a description will be given of a method for transmitting RSs in a preferable RS pattern that improves channel estimation performance irrespective of the positions of RSs, for CoMP implementation in the multi-cell environment.

No CoMP RSs have been defined for LTE-A (Long Term Evolution-Advanced). In general, RSs for CoMP implementation are classified into CRS (Common Reference Signal) for channel state measurement such as channel state information about a plurality of cells and DRS (Dedicated Reference Signal) for demodulation.

Unlike a CRS, a DRS sequence available as a CoMP RS may be mapped within one RB. For example, a DRS sequence of length 12 may be mapped in one RB. However, if the number of cells performing a CoMP operation increases, the length of a PN code may be decreased within one RB and channel estimation performance may be degraded due to lack of dispreading samples for channel estimation. To solve this problem, CoMP RS allocation using orthogonal code resources may be considered.

<CoMP RS Allocation Using Code Resources (in the Same Time and Frequency Region)>

A case where a plurality of cells performing a CoMP operation, that is, a plurality of CoMP cells allocate CoMP RSs to the same time and frequency region may first be considered. For channel estimation, as many code resources as the number of CoMP cells may be generated. Then each CoMP cell may allocate a CoMP RS using allocated code resources.

A set of CoMP cells may be determined largely in the following three methods. One of the methods is that a BS determines CoMP cells from the start and thus generates code resources for CoMP RSs. Another method is that a UE determines the number of CoMP cells based on a threshold (signaled in advance from a BS or preset). The other method is that a BS predetermines a maximum number of CoMP cells and determines the number of CoMP cells based on the predetermined maximum number and a threshold such as an interference level. In this case, if more CoMP cells than the maximum number exceed the threshold, a CoMP set is configured only with the maximum number of CoMP cells, for a CoMP operation.

The determined CoMP cells may be cells of intra eNBs, cells of inter eNBs, or both. Intra-eNB cells may be defined as cells under the same eNB and inter-eNB cells may be defined as cells under different eNBs.

A UE may detect information indicating code resources used for each cell in the following methods.

Firstly, a serving cell may signal all information to the UE. The serving cell may transmit code resource information to the UE on a BCH or by higher layer signaling. In addition, cell IDs of CoMP cells may be indicated using predefined values. That is, code resources may be predefined with respect to cell IDs by allocating code resources in ascending or descending order of the IDs of cells other than the serving cell. Therefore, the UE may detect code resource information about a cell using only the cell ID of the cell.

Secondly, the serving cell may signal only its code resource information and the number of CoMP cells to the UE. Information about the remaining CoMP cells except the serving cell may be identified in a predetermined order. In this case, the UE may identify the neighbor CoMP cells based on a predefined ID (identification) without the need for knowing the cell IDs of the other cells. The serving cell may distinguish the IDs of the other cells using the predefined ID.

Thirdly, a super cell may exist to manage CoMP cells and may broadcast ID information of the CoMP cells to UEs.

In a CoMP operation for soft combining, RSs having the same sequence may be allocated to the same time and frequency region. In this case, code resource-based CoMP RS allocation is not performed. Meanwhile, in any other CoMP scenario than soft combining (e.g. Transmit Diversity (TxD), Spatial Multiplexing (SM), Precoding Matrix Indication (PMI) restriction, etc.), CoMP RSs are allocated using code resources, to thereby facilitate multi-cell channel estimation. If CoMP RSs of a plurality of CoMP cells use the same sequence or are allocated to the same time and frequency region despite different sequences, they are transmitted using code resources for multi-cell channel estimation.

The code resources may cover all orthogonal codes such as Walsh/Hadamard codes, discrete Fourier transform orthogonal codes (circular shifts), etc.

According to the present invention, one subframe may be divided into two or four slots each including 7 OFDM symbols. The subframe may have a TTI of 1 msec. However, the present invention is not limited to the specific subframe and TTI. Rather, various subframes and TTIs may be configured.

1. Case where Each Cell Allocates a CoMP RS Using the Same Pseudo Noise (PN) Code A case where each CoMP cell generates the same PN code for a CoMP RS and allocates the CoMP RS to the same time and frequency region using the same PN code is considered.

Let's assume two cells. Then the following 2×2 Walsh/Hadamard matrix is considered.

$$\begin{bmatrix} 1 & 1 \\ 1 & -1 \end{bmatrix} \quad \text{Equation 1}$$

If code resources are defined by reading the matrix column by column, code 1={1, 1} and code 2={1, −1}. For example, 1 and −1 of code 2 are code resource elements.

For transmission of CoMP RSs, code 1 and code 2 are allocated to cell 1 and cell 2, respectively. Each of the cells may allocate an RS using the allocated code resources along the time or frequency axis. Herein, the description is given in the context of allocating an RS along the time axis.

Figure 2:
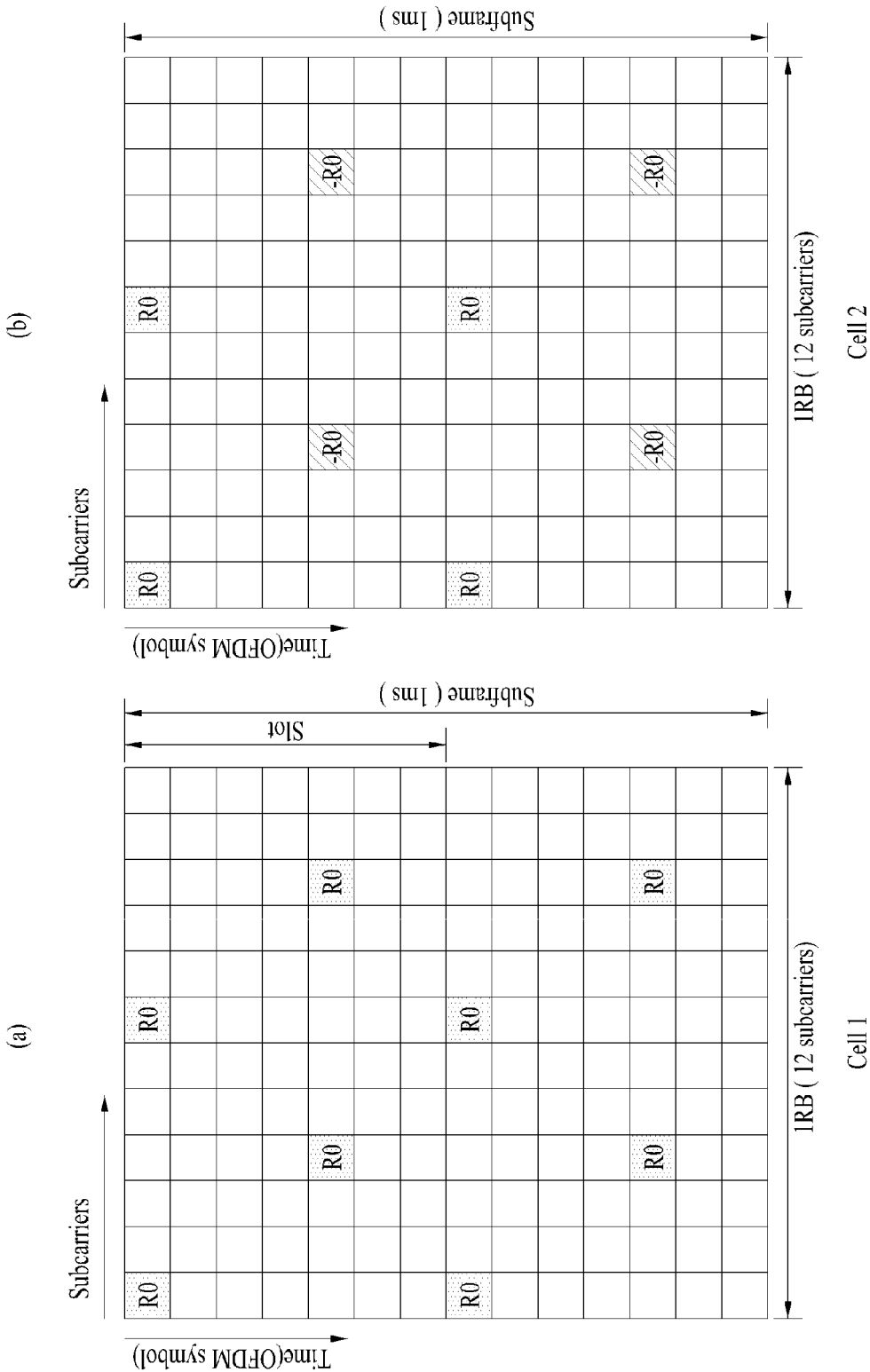
FIG. 2 illustrates exemplary reference signal patterns of allocating reference signals using code resources on a symbol basis in two cells.

FIG. 1 illustrates exemplary RS patterns of allocating RSs using code resources on a slot basis in two cells and FIG. 2 illustrates exemplary RS patterns of allocating RSs using code resources on a symbol basis in two cells.

Referring to FIG. 1, cell 1 to which code 1 has been allocated may allocate an RS R0 to both first and second slots. Unlike cell 1, cell 2 to which code 2 has been allocated may allocate an RS R0 to the first slot and an RS −R0 to the second slot.

R0 and −R0 represent the positions of RSs. −R0 represents an RS created by applying a phase shift, etc. to the RS R0. The RS R0 may be mapped according to the length of an RS allocated to one RB or one symbol.

Referring to FIG. 1 again, the RS R0 with an RB length of 4 is mapped on an RB basis. When cell 1 and cell 2 allocate RSs using code resources on a slot basis, for transmission, all of the RSs may be completely transmitted in two slots.

A UE receives the RSs on a channel h1 established with cell 1 and a channel h2 established with cell 2. For example, the UE may receive (h1+h2)·R0 at a code resource-based first transmission and (h1−h2)·R0 at a code resource-based second transmission. Then the UE may estimate each channel using the received signals. In another example, the UE may obtain a channel 2·h1·R0 by adding the first transmission (h1+h2)·R0 to the second transmission (h1−h2)·R0. Likewise, the UE may obtain a channel 2·h2·R0 using the difference between the first transmission (h1+h2)·R0 and the second transmission (h1−h2)·R0.

If a UE performing a CoMP operation has frequency diversity channel characteristics and moves slowly, it may achieve a high gain. However, when intra-eNB cells perform the CoMP operation, the UE may move relatively fast despite a small frequency diversity. In this case, a channel is more sensitive to time. Therefore, the RS patterns illustrated in FIG. 1 may be modified to the RS patterns illustrated in FIG. 2.

Referring to FIG. 2, the code resources (code 1={1, 1}, code 2={1, −1}) may be allocated on a symbol basis. That is, each of the code resource elements 1 and 1 may be allocated to one OFDM symbol within a slot, and each of the code resource elements 1 and −1 may be allocated to one OFDM symbol within the slot. As cell 1 and cell 2 allocate RSs using the code resources on a symbol basis, they may completely transmit the RSs in one slot, compared to the slotwise RS allocation.

Each type of the RS patterns of FIGS. 1 and 2 may have a variable performance depending on channel characteristics. Accordingly, the two types of patterns are configured and an appropriate pattern type is selectively used according to a cell situation. That is, if a cell has a small frequency diversity and moves relatively fast, the RS patterns of FIG. 2 are preferred. In this manner, an RS may be transmitted using code resources allocated on a slot basis or on a symbol basis in a cell. An RS may be allocated using code resources on a slot or symbol basis in the time domain and on a RB or subcarrier basis in the frequency domain in a slot or symbol. The code resources may include orthogonal codes such as Walsh/Hadamard codes, DFT orthogonal codes (circular shifts), etc.

Now, it is assumed that there are three cells. It is rather difficult to support orthogonality for an odd number of CoMP cells with a Walsh/Hadamard matrix. Hence, DFT orthogonal codes (time-domain circular shifts) are preferable to support an odd number of CoMP cells. DFT orthogonal codes are useful to support an even number of CoMP cells as well.

A description will be given below of a method for performing a CoMP operation using DFT orthogonal codes (time-domain circular shifts) in three cells. Code Division Multiplexing (CDM)-based DRS extension refers to CDM of RS symbols of CoMP cells by cyclically shifting a PN sequence multiplied by the RS symbols. For example, a DRS may be expressed as Equation 2.

$$r(m) = \frac{1}{\sqrt{2}}(1 - 2 \cdot c(2m)) + j\frac{1}{\sqrt{2}}(1 - 2 \cdot c(2m+1)), \quad \text{Equation 2}$$

$$m = 0, 1, \ldots, 12N_{RB}^{PDSCH} - 1$$

An orthogonal sequence may be generated by cyclically shifting a sequence used for RS symbols described as Equation 2 in the time domain. Different orthogonal sequences are generated in this manner and allocated to the CoMP cells in CDM. Thus, the RS symbols of the CoMP cells can be allocated and transmitted simultaneously using the orthogonal sequences. For example, a time-domain cyclic shift of the PN sequence used for the RS symbols described as Equation 2 results in a frequency-domain product between a phase-shifted sequence and the PN sequence. An orthogonal sequence $\tilde{r}_i(m)$ obtained from a sequence r(m) may be given by Equation 3. N orthogonal sequences may be generated according to $\theta_i$ (i=1, 2, ..., N) and N may vary depending on a channel state.

$$\tilde{r}_i(m) = r(m)e^{-j\theta_i m} \quad \text{Equation 3}$$

where $$\theta_i = \frac{2\pi(i-1)}{N}.$$

Figure 3:
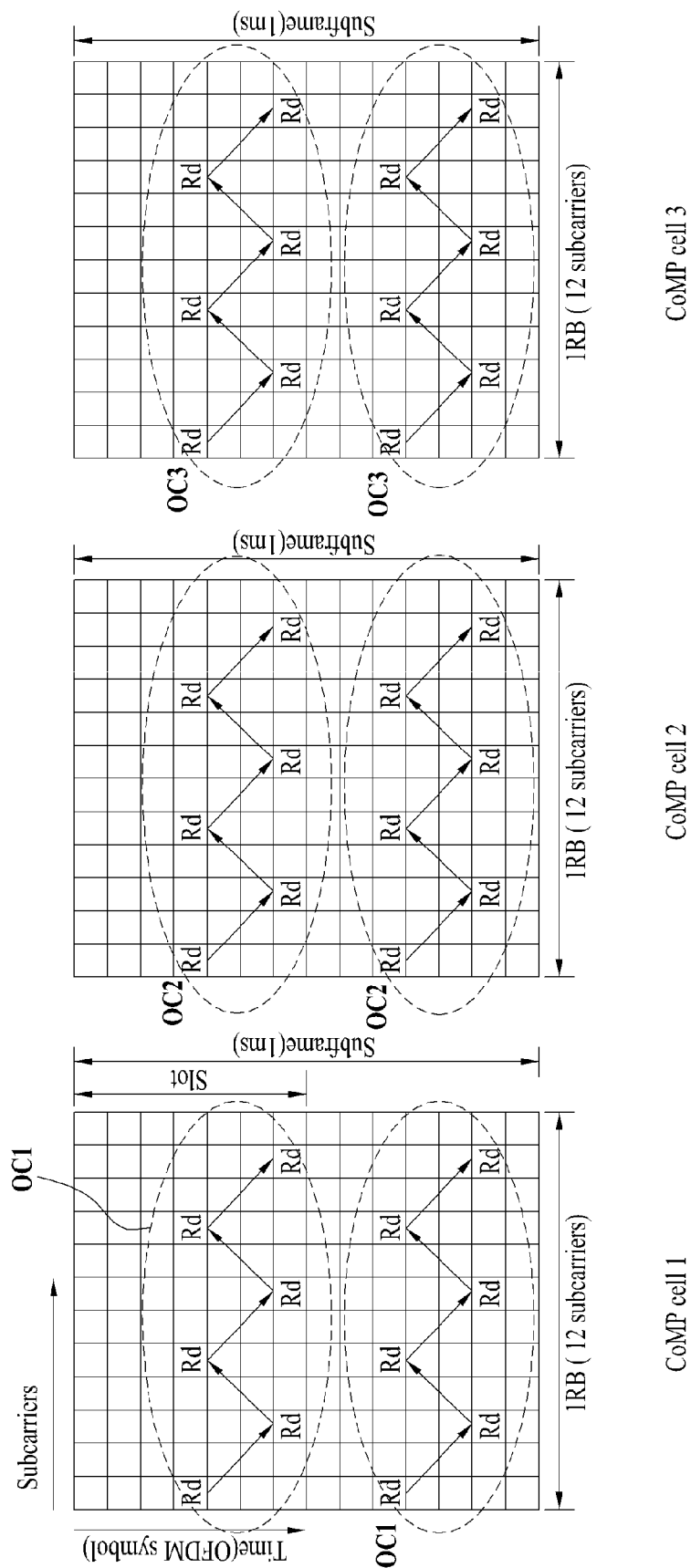
FIG. 3 illustrates exemplary reference signal patterns of allocating reference signals using DFT orthogonal codes on a slot basis in three cells.
Figure 4:
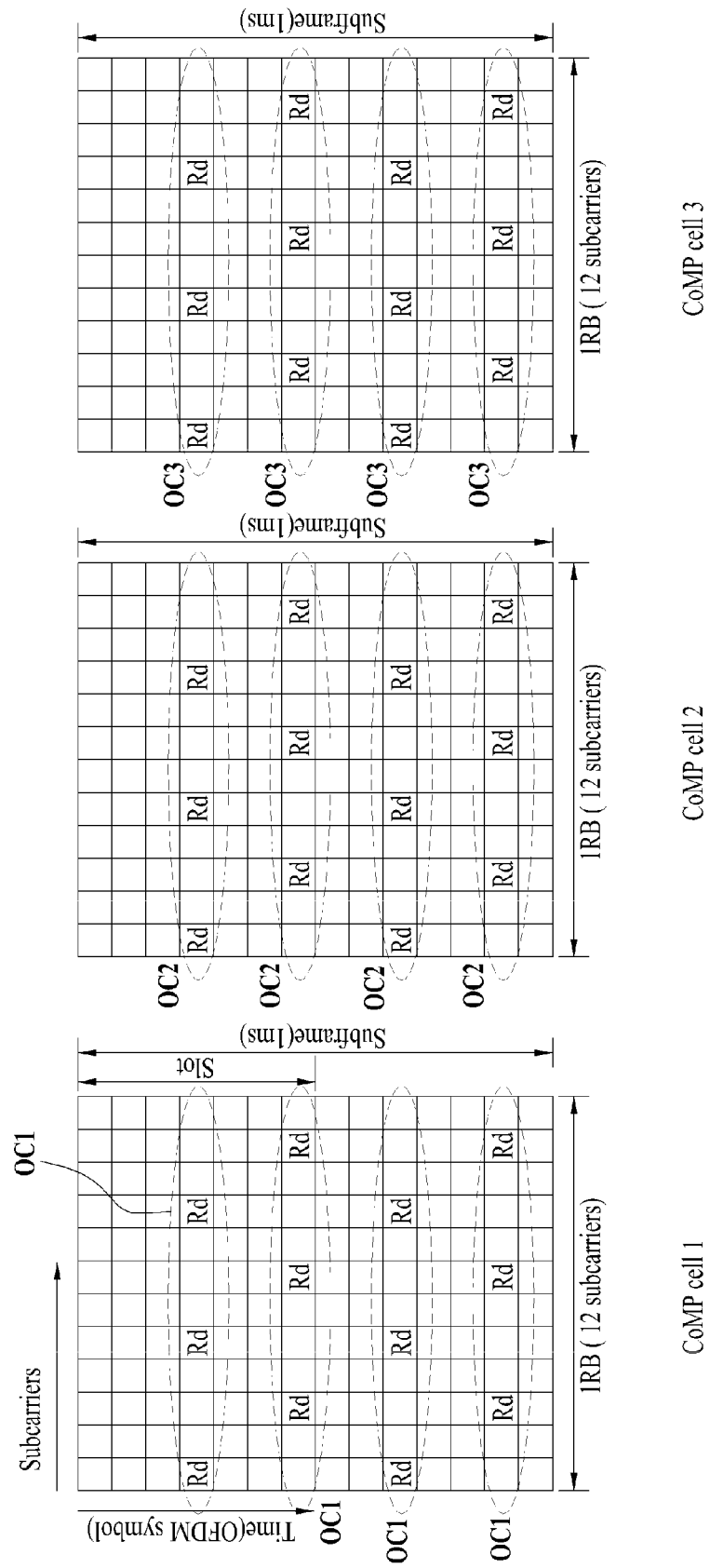
FIG. 4 illustrates exemplary reference signal patterns of allocating reference signals using DFT orthogonal codes on a symbol basis in three cells.

FIG. 3 illustrates exemplary RS patterns of allocating RSs using DFT orthogonal codes on a slot basis in three cells and FIG. 4 illustrates exemplary RS patterns of allocating RSs using DFT orthogonal codes on a symbol basis in three cells.

Referring to FIGS. 3 and 4, when three cells perform a CoMP operation, N=3 and three orthogonal sequences may be generated for the three CoMP cells. The orthogonal sequences may be allocated to the cells and mapped to DRSs on a slot or symbol basis. The orthogonal sequences allocated to the respective CoMP cells are mutually orthogonal. The cyclic shift values $\theta_i$ of the different orthogonal sequences should be sufficiently apart from one another so as to allow the impulse responses of channels from the CoMP cells to be distinguished from one another. That is, for example, if the system has an effective OFDM symbol length of 66.7 μsec and operates in a channel environment with a maximum delay spread of 5 μsec, the cyclic shift values should have a minimum granularity of 5 μsec and thus up to 12 cyclic shift values can be distinguished.

As illustrated in FIG. 3, each cell may allocate an RS, Rd with a spacing of 4 subcarriers in each of two OFDM symbols in a slot in order to avoid overlapping. The RS may be allocated in the other slot in the same manner. Since each cell uses a different orthogonal code, a UE identify the cell that has transmitted an RS. In the case where an RS is inserted with a spacing of 4 subcarriers in the frequency domain, the number of available cyclic shifts is decreased by four times. In this case, 12/2=6 cyclic shifts are available. However, this is possible only when a channel hardly changes during a corresponding period of time.

Referring to FIG. 3 again, a cyclic shift may be applied to two OFDM symbols including pilot symbols. With the cyclic shift of Equation 3, a linear phase increment may be applied alternately between the two paired OFDM symbols. This method advantageously decreases the frequency spacing between pilot symbols and thus makes more cyclic shifts available.

Referring to FIG. 4 again, symbolwise cyclic shifting may bring about a high performance gain in a fast mobile environment in which a channel changes fast. However, the number of available cyclic shifts decreases and as a result, the maximum number of CoMP cells that can transmit RSs may decrease.

As stated before, orthogonal sequences may be mapped to RSs on a slot basis and on a symbol basis in FIGS. 3 and 4. However, orthogonal sequences may be mapped to RSs on a subframe basis to support more CoMP cells. It is also possible to map orthogonal sequences to RSs in units of a plurality of subframes.

Four cells are assumed and the following 4×4 Walsh/Hadamard matrix is considered.

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} \qquad \text{Equation 4}$$

If code resources are defined by reading the matrix column by column, code 1={1, 1, 1, 1}, code 2={1, −1, 1, −1}, code 3={1, 1, −1, −1}, and code 4={1, −1, −1, 1}.

Figure 5:
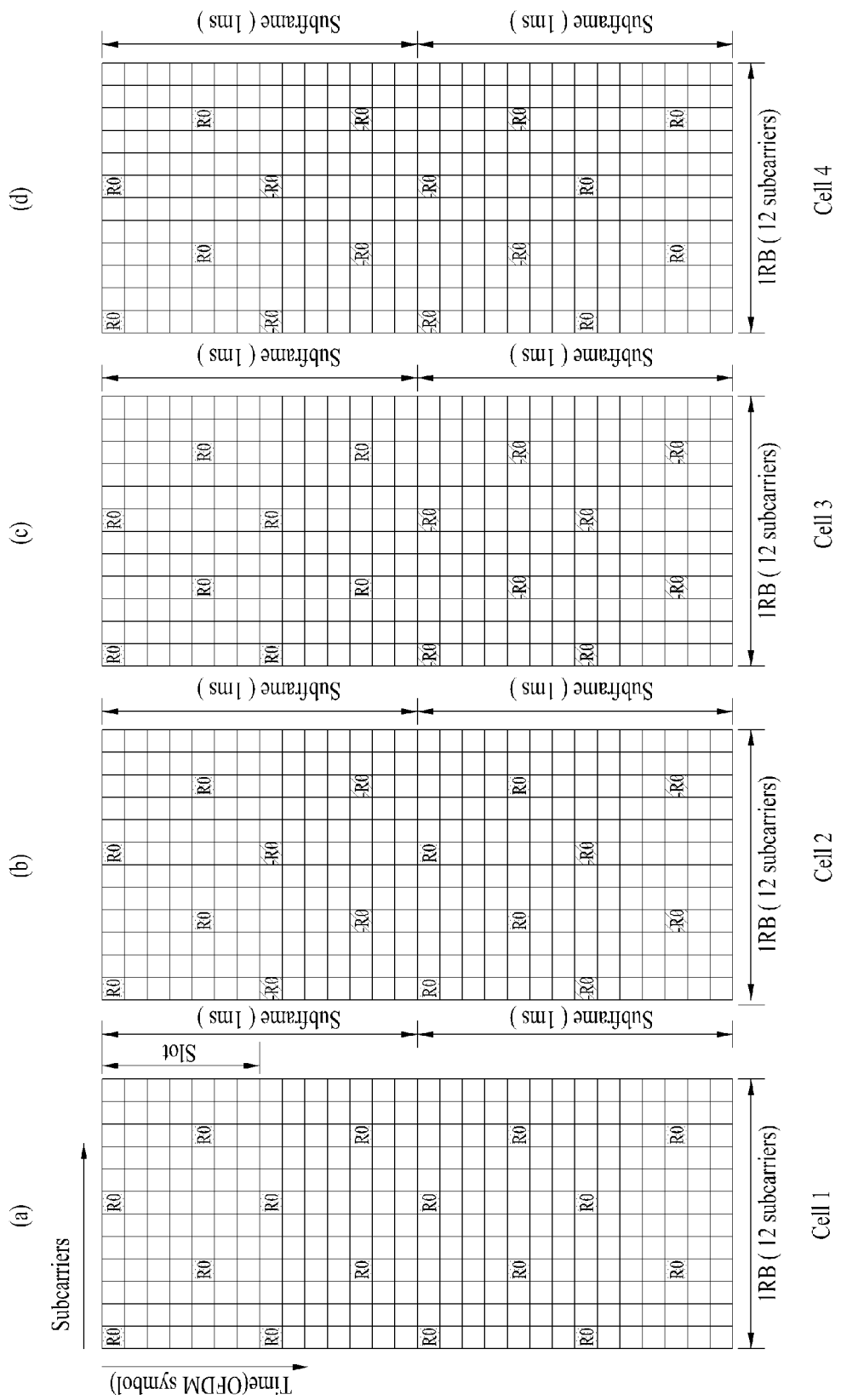
FIG. 5 illustrates exemplary reference signal patterns of allocating reference signals using code resources on a slot basis in four cells.
Figure 6:
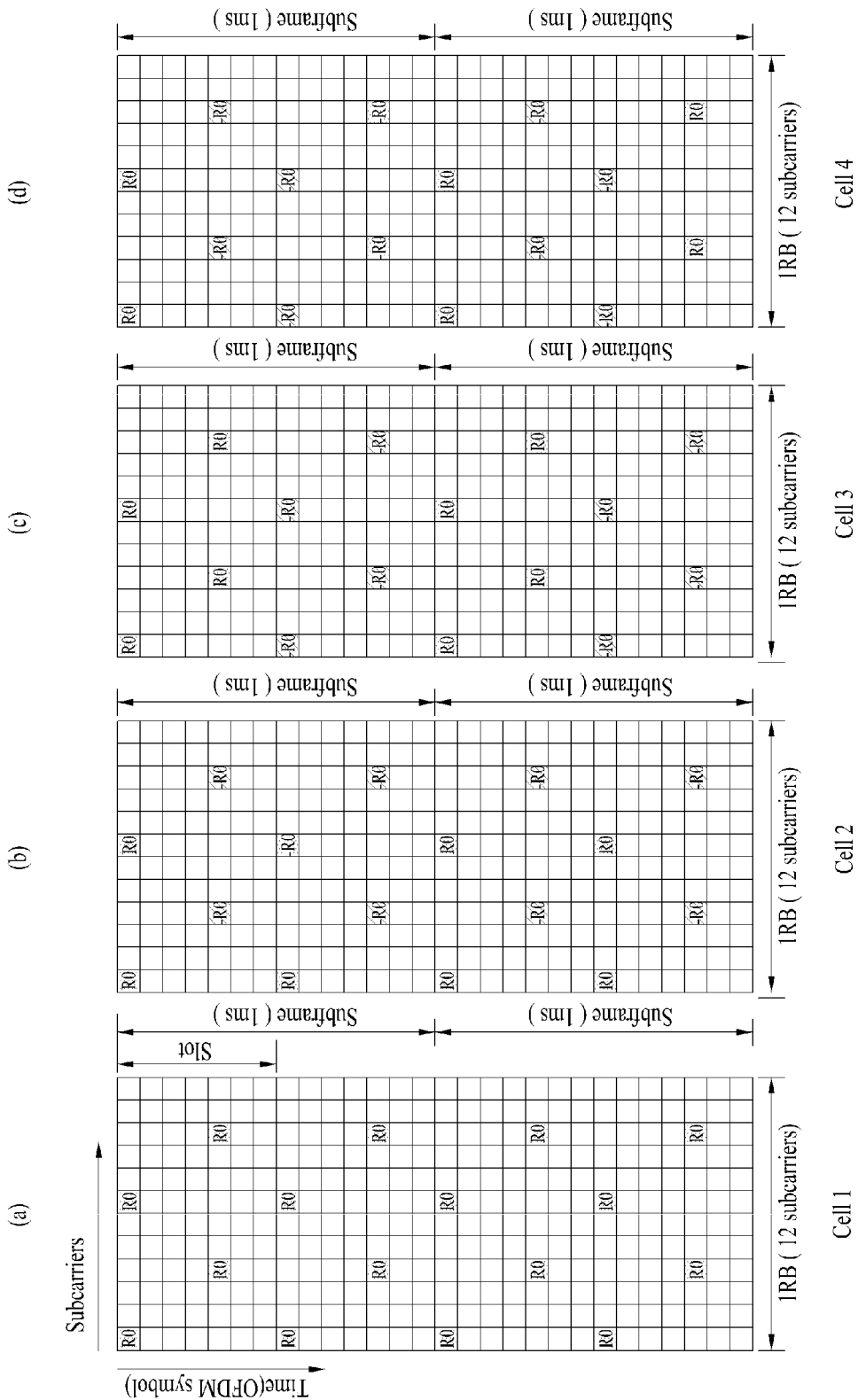
FIG. 6 illustrates exemplary reference signal patterns of allocating reference signals using code resources on a symbol basis in four cells.

FIG. 5 illustrates exemplary RS patterns of allocating RSs using code resources on a slot basis in four cells and FIG. 6 illustrates exemplary RS patterns of allocating RSs using code resources on a symbol basis in four cells.

Referring to FIGS. 5 and 6, code 1, code 2, code 3 and code 4 are allocated to cell 1, cell 2, cell 3 and cell 4, respectively, for transmission of CoMP RSs. Each of the cells may allocate an RS along the time or frequency axis using its allocated code resources. Herein, an RS is allocated along the time axis and transmitted, by way of example. An RS, R0 of an RB length of 4 is mapped on an RB basis. One subframe may be divided into four slots each having 7 OFDM symbols.

Referring to FIG. 5, cell 1 to which code 1 has been allocated may allocate the RS R0 to first to fourth slots. Cell 2 to which code 2 has been allocated may allocate the RS R0 to the first slot, an RS −R0 to the second slot, the RS R0 to the third slot, and the RS −R0 to the fourth slot. Cell 3 to which code 3 has been allocated may allocate the RS R0 to the first slot, the RS R0 to the second slot, the RS −R0 to the third slot, and the RS −R0 to the fourth slot. Cell 4 to which code 4 has been allocated may allocate the RS R0 to the first slot, the RS −R0 to the second slot, the RS −R0 to the third slot, and the RS R0 to the fourth slot. In a similar manner to allocation of the RSs R0 and −R0 in cell 1 and cell 2, cell 3 and cell 4 may allocate the RSs R0 and −R0 using their allocated code resources on a slot basis.

When cell 1 to cell 4 allocate RSs using the allocated code resources on a slot basis in this manner, the RSs may be completely transmitted in four slots.

Referring to FIG. 5 again, the UE may receive the RSs from cell 1 to cell 4 on a channel h1 established with cell 1, on a channel h2 established with cell 2, on a channel h3 established with cell 3, and on a channel h4 established with cell 4. The UE may receive (h1+h2+h3+h4)·R0 at a first transmission, (h1−h2+h3−h4)·R0 at a second transmission, (h1+h2−h3−h4)·R0 at a third transmission, and (h1−h2−h3+h4)·R0 at a fourth transmission, in the code resources. Then the UE may estimate the channels using the received signals.

In an example of channel estimation, the UE may obtain the channel h1 by summing (h1+h2+h3+h4)·R0, (h1−h2+h3−h4)·R0, (h1+h2−h3−h4)·R0, and (h1−h2−h3+h4)·R0 received at the first to fourth transmissions. In a similar manner, the UE may obtain the other channels h2, h3 and h4. The code resources may include Walsh/Hadamard codes, DFT orthogonal codes (circular shifts), etc.

Referring to FIG. 6 again, an RS may be allocated on a symbol basis in one slot. The code resources (code 1={1, 1, 1, 1}, code 2={1, −1, −1, 1}, code 3={1, 1, −1, −1}, code 4={1, −1, −1, 1}) may be allocated on a symbol basis. That is, for example, the first code resource elements 1 and −1 of 1, −1, −1, 1 may be allocated to different OFDM symbols in one slot, while the other code resource elements −1 and 1 may be allocated to different OFDM symbols in another slot. The code resources of code 1, code 2, and code 3 may be allocated in a similar manner. The symbolwise RS allocation enables complete transmission of RSs in two slots, compared to the slotwise RS allocation in which RSs are completely transmitted in four slots.

The RS allocation patterns of FIG. 5 allow a UE performing a CoMP operation to have high frequency diversity channel characteristics. When the UE moves slowly, it may have a high gain. However, when intra-eNB cells are used in a CoMP operation, the UE may move relatively fast with a small frequency diversity. In this case, a channel is more sensitive to time and thus the slotwise RS allocation patterns illustrated in FIG. 5 may be modified to the symbolwise RS allocation patterns illustrated in FIG. 6.

Each of the RS pattern types of FIGS. 5 and 6 may have a variable performance depending on channel characteristics. Accordingly, the two pattern types are configured and an appropriate pattern type is selectively used according to a cell situation. That is, if a cell has a small frequency diversity and moves relatively fast, the RS patterns of FIG. 6 are preferred. In this manner, an RS may be transmitted using code resources allocated on a slot or symbol basis in a cell. An RS allocated to code resources may be allocated on a slot or symbol basis in the time domain and on a RB or subcarrier basis in the frequency domain in a slot or symbol. The code resources may include orthogonal codes such as Walsh/Hadamard codes, DFT orthogonal codes (circular shifts), etc.

2. Case where Cells Transmit CoMP RSs using Different PN Codes

A case where CoMP cells generate different PN codes for their CoMP RSs and allocate the PN codes to the same time/frequency region may be considered. Like the illustrated cases of FIGS. 1 and 2, it is assumed that two cells perform a CoMP operation.

Figure 7:
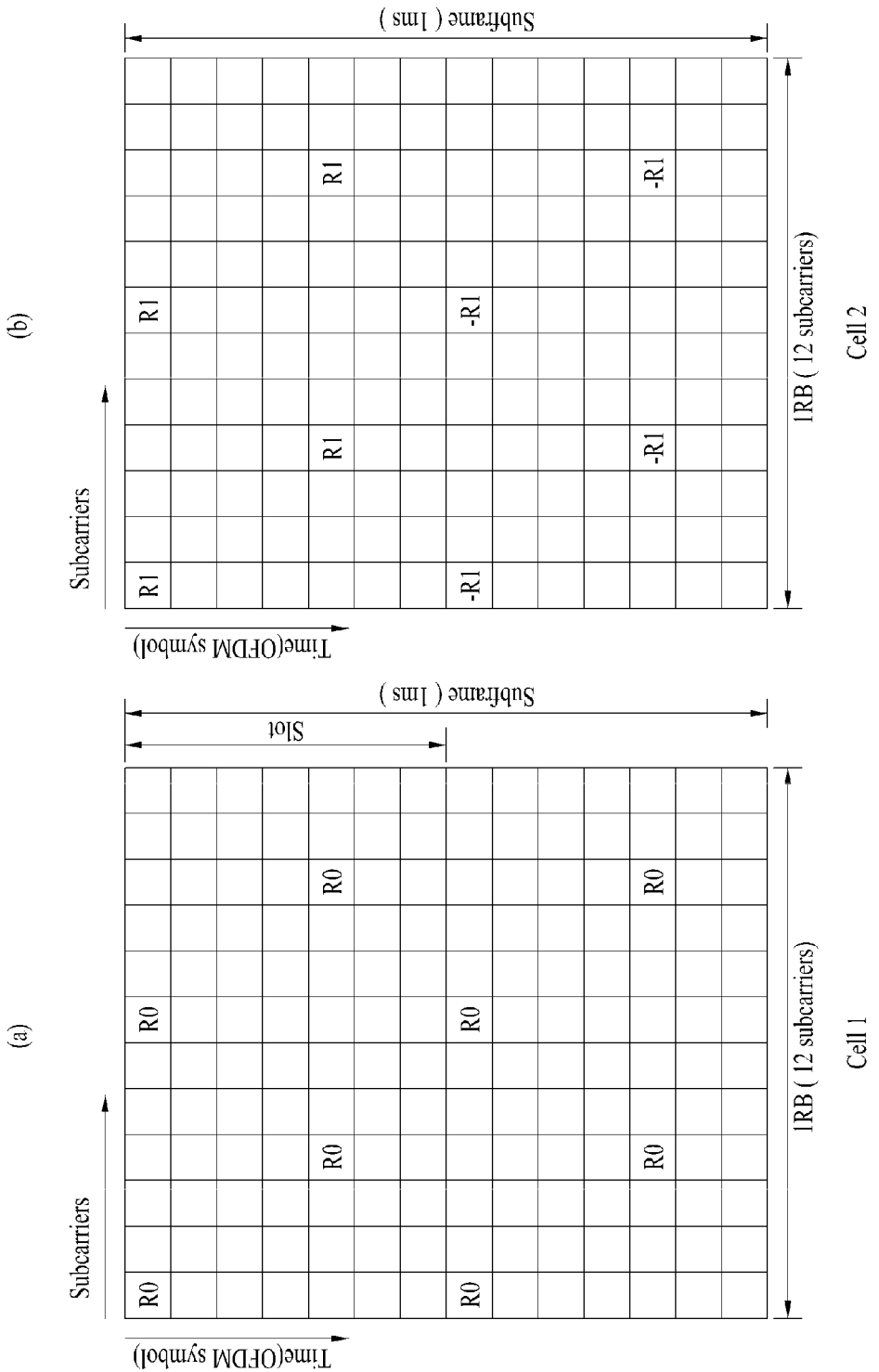
FIG. 7 illustrates exemplary reference signal patterns of generating different PN codes and allocating reference signals using the code resources on a slot basis in two cells.
Figure 8:
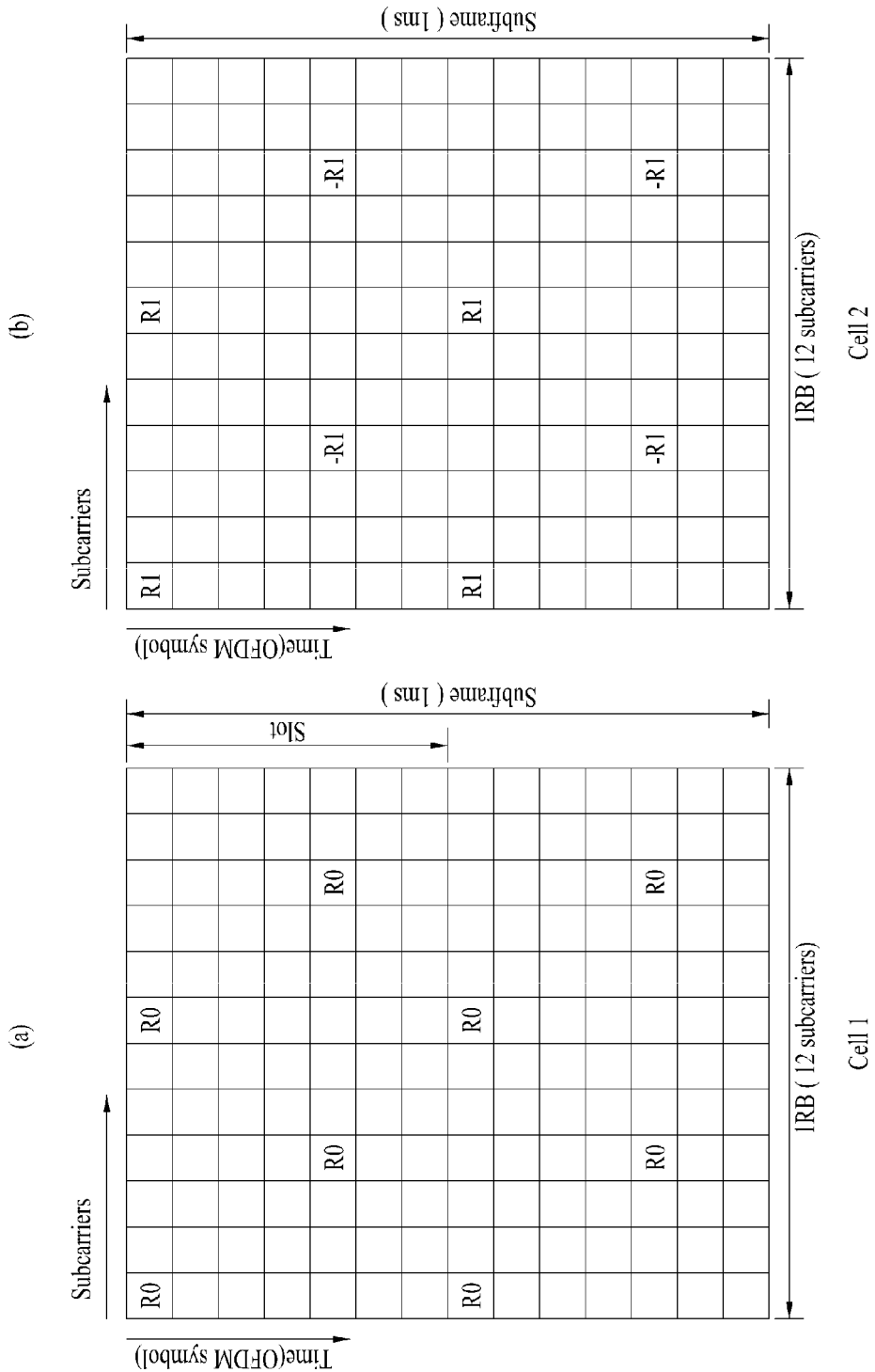
FIG. 8 illustrates exemplary reference signal patterns of generating different PN codes and allocating reference signals using the code resources on a symbol basis in two cells.

FIG. 7 illustrates exemplary RS patterns of allocating RSs using code resources on a slot basis in two cells that generate different PN codes and FIG. 8 illustrates exemplary RS patterns of allocating RSs using code resources on a symbol basis in two cells that generate different PN codes.

Referring to FIG. 7, one subframe may be divided into two slots each having 7 OFDM symbols. Cell 1 and cell 2 may allocate RSs (e.g. R0 and R1) based on different PN codes. Cell 1 may allocate the RS R0 in the RS allocation pattern of FIG. 1. Cell 2 may also allocate the RS R1 in the pattern of allocating the RS R0 illustrated in FIG. 2, except that the RS R0 is replaced with the RS R1. When cell 1 and cell 2 allocate the RSs on a slot basis using code resources, the RSs can be completely transmitted in two slots.

Referring to FIGS. 7 and 8, R0 and R1 denote the positions of RSs and −R0 and −R1 represent RSs to which a phase shift, etc. is applied using code resources. The RSs R0 and R1 may be mapped according to the length of an RS sequence allocated to one RB or one symbol.

A UE receives RSs that have experienced a channel h1 established with cell 1 and a cell h2 established with cell 2. The UE may receive (h1·R0+h2·R1) at a first transmission and (h1·R0−h2·R1) at a second transmission, using the code resources. The UE may estimate the channels using the received signals.

In an example of channel estimation, the UE may acquire a channel 2h1·R0 by adding the first transmission (h1·R0+h2·R1) to the second transmission (h1·R0−h2·R1). Likewise, the UE may acquire a channel 2h2·R1 by using the difference between the first transmission (h1·R0+h2·R1) and the second transmission (h1·R0−h2·R1). In this method, the UE may perform accurate channel estimation using the RSs.

Referring to FIG. 8 again, cell 1 and cell 2 allocate the RSs R0 and R1 on a symbol basis. Cell 1 and cell 2 may allocate the RSs in the same symbolwise RS allocation patterns of FIG. 2. The symbolwise RS allocation of FIG. 8 is different from the slotwise RS allocation of FIG. 7 in that cell 1 and cell 2 can transmit all of their RSs in one slot.

Now, a case in which a plurality of cells allocate UE-specific antenna port 5 for CoMP to the same time/frequency region in an RS structure defined in 3GPP LTE (3$^{rd}$ Generation Partnership Project Long Term Evolution) release 8. Antenna port 5 may be used for beamforming which is a technology for increasing the throughput of UEs. Port 5 may also be used for performing a CoMP operation to increase cell-edge performance.

Figure 9:
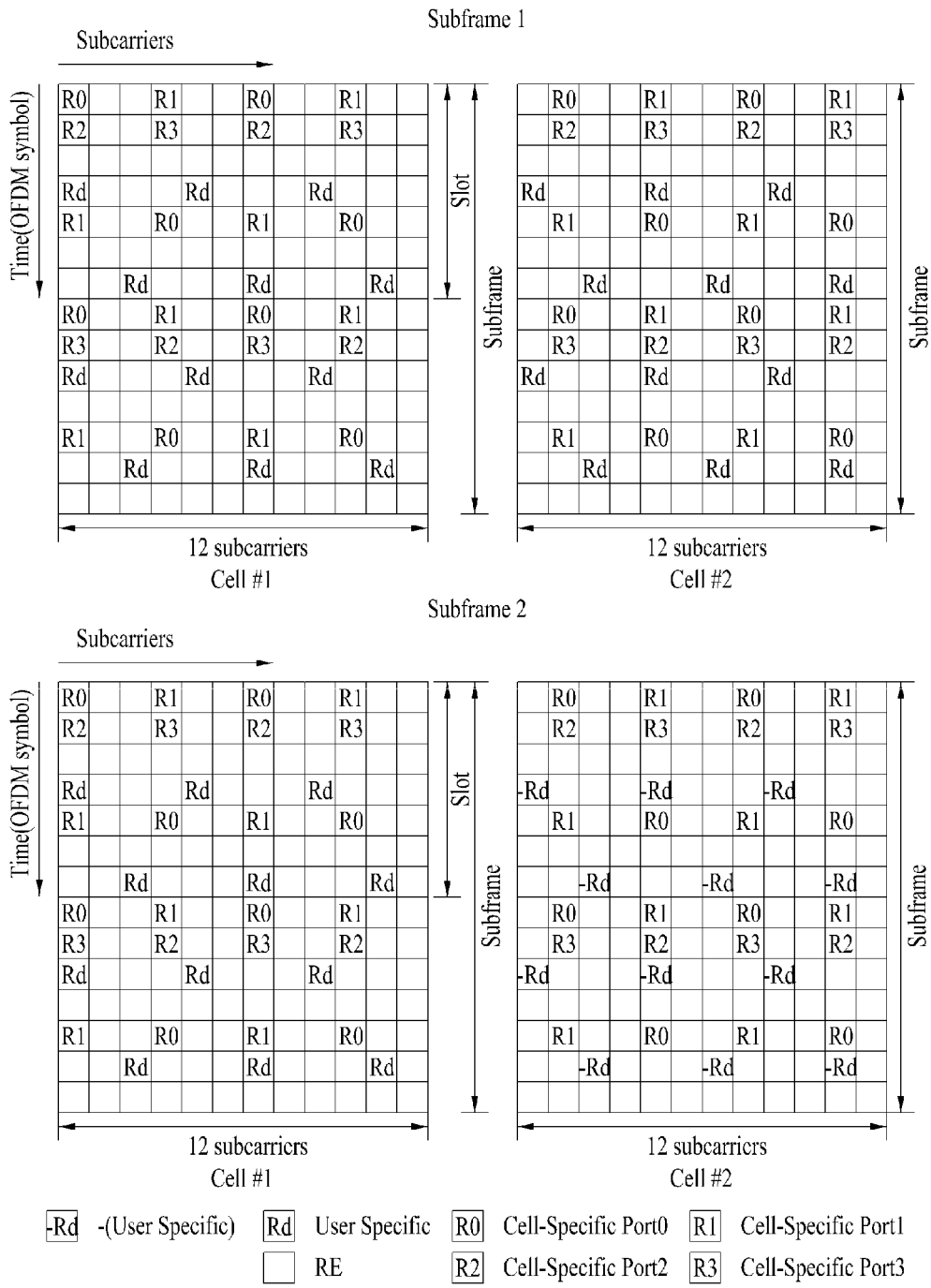
FIG. 9 illustrates exemplary reference signal patterns of allocating reference signals (UE-specific antenna port 5) using code resources in a plurality of cells.

FIG. 9 illustrates exemplary RS patterns of allocating RSs (UE-specific antenna port 5) using code resources in a plurality of cells.

Referring to FIG. 9, cell 1 allocates a CoMP RS across two subframes using code resources {1, 1} and cell 2 allocates a CoMP RS across two subframes using code resources {1, −1}, for channel estimation of each channel. That is, cell 1 may allocate its CoMP RS to subframe 1 using the code resource element 1 and to subframe 2 using the code resource element 1, while cell 2 may allocate its CoMP RS to subframe 1 using the code resource element 1 and to subframe 2 using the code resource element −1. In this case, each cell can transmit the whole CoMP RS in two subframes.

A cell-specific RS is common to all UEs within a cell and a UE-specific RS is dedicated to a particular UE. A plurality of cells may transmit CRSs through cell-specific ports 0 to 3, and DRSs through UE-specific ports. The positions of the CRSs may be shifted according to the cells. However, the plurality of cells may transmit the DRSs in the same positions, for a CoMP operation.

A UE-specific RS may be transmitted through a single antenna port on a Physical Downlink Shared CHannel (PDSCH). A UE may determine by higher layer signaling whether a UE-specific RS exists for demodulation of a PDSCH and the UE-specific RS is valid. The UE-specific RS is transmitted only on an RB to which the PDSCH is mapped. Now a description will be given of resource element mapping, when a UE-specific RS is transmitted.

For example, the following resource element mapping may be considered. On the assumption that an RS sequence r(m) is mapped to complex-value modulation symbols $a_{k,l}^{(p)}$ using antenna port 5, an equation that ignores the following cell-specific frequency shift $v_{shift}=N_{ID}^{cell}$ mod 3 may be considered.

$$a_{k,l}^{(p)} = r(3 \cdot l' \cdot N_{RB}^{PDSCH} + m')$$

$$k = (k') \bmod N_{sc}^{RB} + N_{sc}^{RB} \cdot n_{PRB}$$

$$k' = \begin{cases} 4m' + & \text{if } l \in \{2, 3\} \\ 4m' + 2\bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

Here, (k, l) denotes a resource element with frequency index k and time index j, $a_{k,l}^{(p)}$ denotes the value of the resource element (k, l) for antenna port P, $N_{sc}^{RB}$ denotes the frequency-domain size of an RB, expressed as the number of subcarriers, $n_s$ denotes the number of slots in one radio frame, and $N_{RB}^{PDSCH}$ denotes the number of RBs in a PDSCH.

Referring to FIG. 9 again, cell 1 and cell 2 may allocate CRSs for a plurality of cell-specific ports 0 to 3 to subframe 1 and subframe 2 in such a manner that the CRSs are not overlapped between cell 1 and cell 2. Cell 1 and cell 2 may allocate DRSs not to be overlapped with the CRSs. The DRSs may be located at the same positions between cell 1 and cell 2.

Transmission of Multi-Antenna CoMP RSs Using Code Resources

A case in which each of CoMP cells uses a plurality of antennas will be considered. Each cell may transmit CRSs through currently defined antenna ports 0 to 3 so that channel states (e.g. CSI), etc. can be measured using the CRSs. On the other hand, each of the CoMP cells transmits only an RS for one antenna port as a DRS in one slot or subframe. However, a plurality of antennas need to be supported even for transmission of a DRS for demodulation. The CoMP RS transmission using orthogonal code resources according to the aforedescribed embodiments of the present invention may be extended to orthogonal code resource-based CoMP RS transmission through a plurality of antennas in each of CoMP cells.

It is assumed that two cells each having two transmission antennas perform a CoMP operation.

Figure 10:
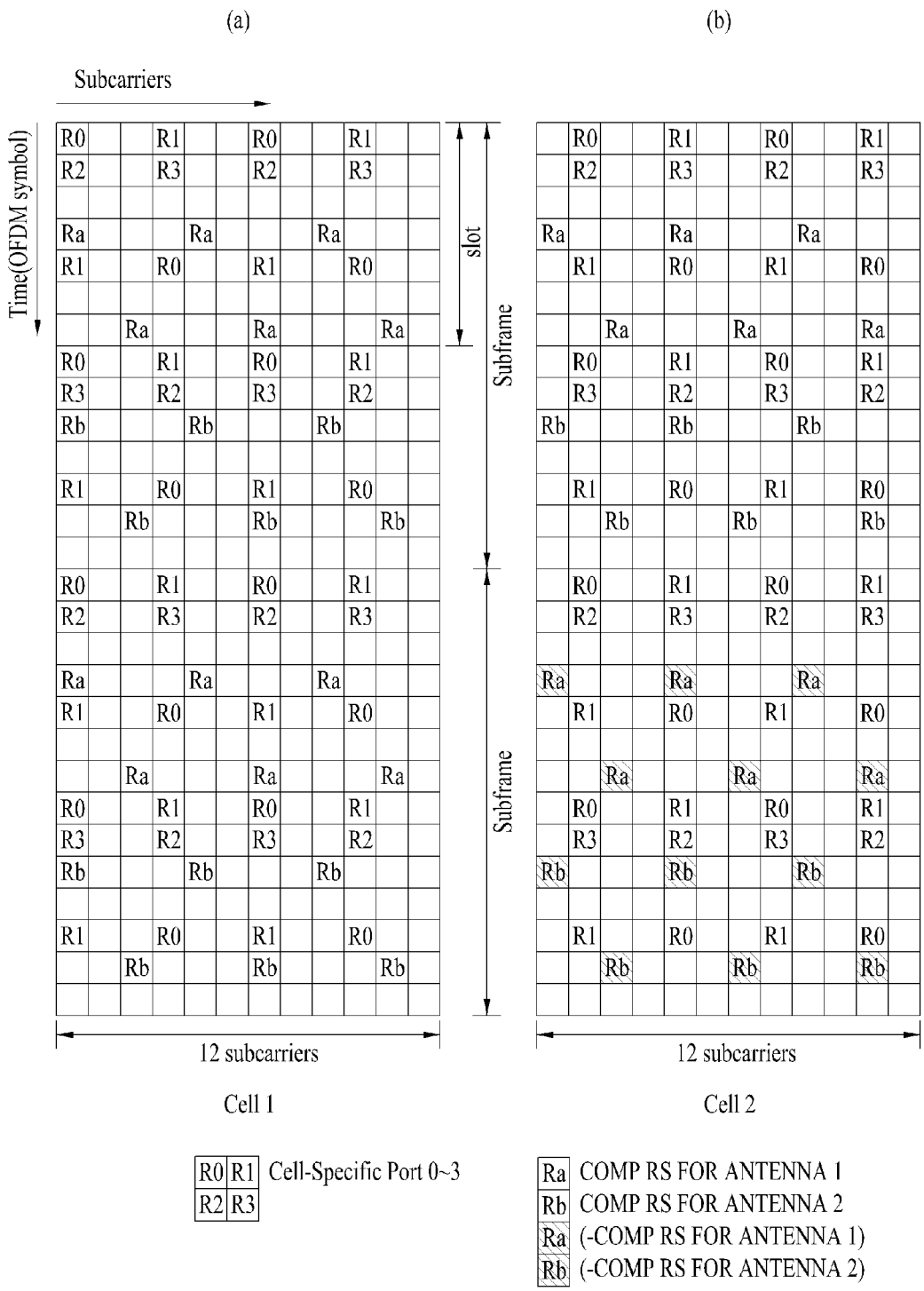
FIG. 10 illustrates exemplary reference signal patterns of allocating multi-antenna CoMP reference signals using code resources in two cells each having two transmission antennas.

FIG. 10 illustrates exemplary RS patterns of allocating multi-antenna CoMP RSs using code resources in two cells each having two transmission antennas.

Referring to FIG. 10, one subframe may be divided into two slots each slot include 7 OFDM symbols. When a CoMP RS is transmitted as a dedicated RS, each cell may transmit a RS corresponding to each antenna on a slot basis or on a symbol basis. Cell-specific ports 0 to 3 may transmit CRSs. CRSs of cell 1 and cell 2 for cell-specific antenna ports 0 to 3 may be allocated in such a manner that the CRSs are not overlapped between cell 1 and cell 2 in one subframe.

As described in the matrix of Equation 1, code resources 1 may be allocated to a serving cell, cell 1 and code resources 2 may be allocated to a neighbor cell, cell 2. Each cell may transmit its RSs along the time or frequency axis using the allocated code resources. Herein, the following description is given in the context of RS transmission along the time axis, by way of example.

Cell 1 to which code 1 has been allocated may allocate a CoMP RS, Ra for a first antenna to a first slot and a CoMP RS, Rb for a second antenna to a second slot in a first subframe. That is, the CoMP RSs for the first and second antennas may be completely transmitted in two slots. In the same manner, the CoMP RSs for the first and second antennas may be allocated to a second subframe. They may also be allocated to the other slots of each subframe in a similar manner. The DRSs may be allocated not to be overlapped with the CRSs. In addition, cell 1 and cell 2 may allocate the DRSs at the same positions.

Unlike cell 1, cell 2 to which code 2 has been allocated may allocate the CoMP RS Ra for a first antenna to the first slot and the CoMP RS Rb for the second antenna to the second slot in the first subframe. In the second subframe, cell 2 may allocate CoMP RSs, −Ra and −Rb to the first and second slots, respectively. The RSs for the two antennas have not been transmitted completely until the two slots are transmitted.

RS transmission through COMP multi-antennas may precede transmission of CoMP RSs using code resources.

Figure 11:
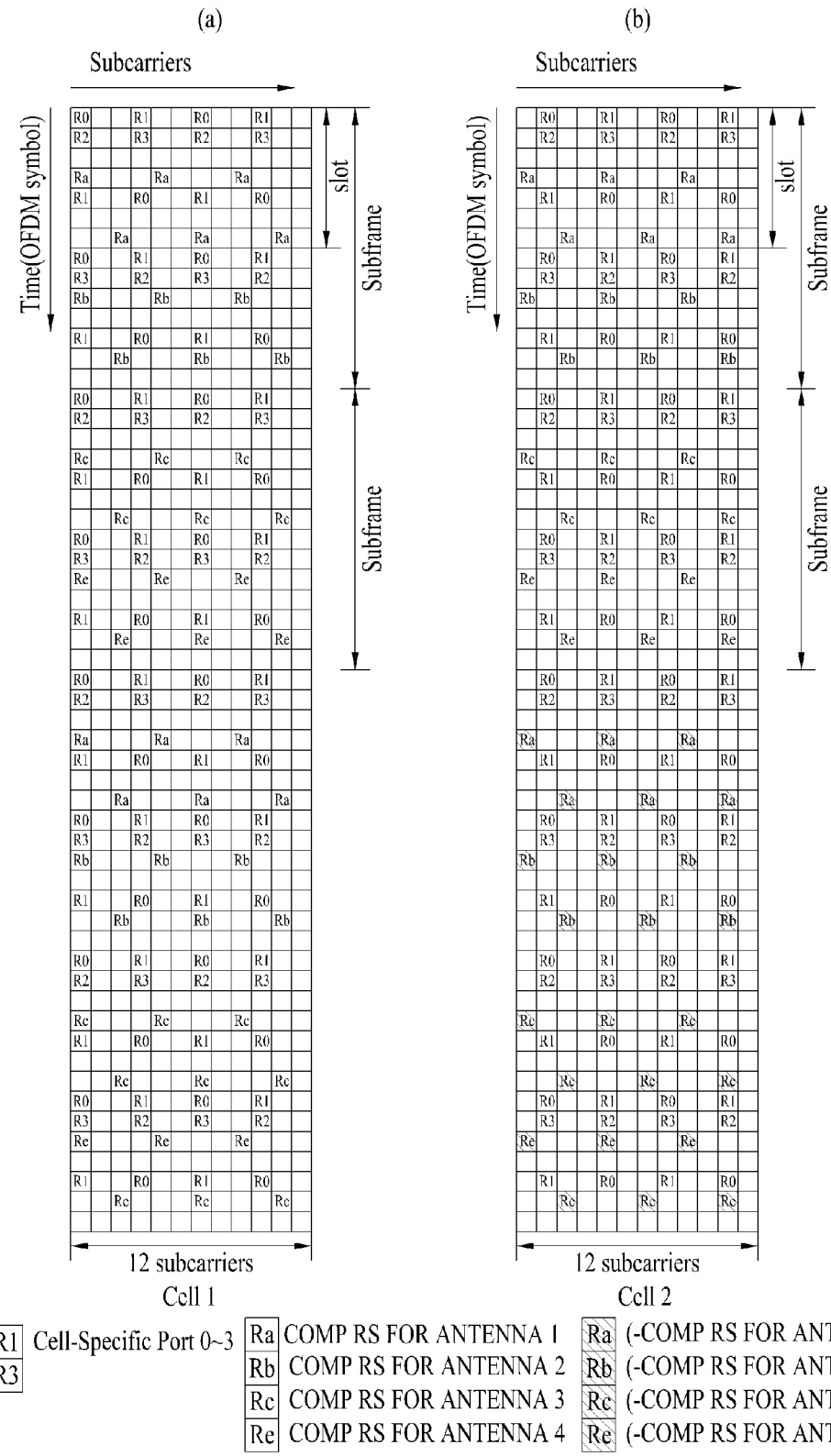
FIG. 11 illustrates exemplary reference signal patterns of allocating multi-antenna CoMP reference signals using code resources in two cells each having four transmission antennas.

FIG. 11 illustrates exemplary RS patterns of allocating multi-antenna CoMP RSs using code resources in two cells each having four transmission antennas.

Referring to FIG. 11, each cell may allocate 4-antenna CoMP RSs to four subframes.

In cell 1, a CoMP RS Ra for a first antenna may be allocated to a first slot and a CoMP RS Rb for a second antenna may be allocated to a second slot in a first subframe. Then a CoMP RS Rc for a third antenna may be allocated to a first slot and a CoMP RS Rd for a fourth antenna may be allocated to a second slot in a second subframe. The CoMP RSs may be allocated to a third subframe in the same manner as in the first subframe and may be allocated to a fourth subframe in the same manner as in the second subframe. In each of two OFDM symbols in a slot of each subframe, a DRS may be allocated with a spacing of four subcarriers to avoid overlapping. The DRS may be allocated not to be overlapped with a CRS in each slot.

In cell 2, CoMP RSs for four antennas may be allocated across four subframes, similarly to the CoMP RS allocation of cell 1. The CRSs of cell 1 and cell 2 may be allocated not to be overlapped with each other.

If a UE at an edge of a CoMP cell moves slowly, each of CoMP cells may transmit multi-antenna RSs on a symbol, slot or subframe basis. In the above embodiments of the present invention, multi-antenna CoMP RSs are transmitted on a slot basis and orthogonal code covering is performed on a subframe basis. These units may vary according to the number of antennas in each cell and the number of CoMP cells. In addition to the above embodiments, symbolwise or subframewise multi-antenna CoMP RS transmission and an associated orthogonal code covering may be considered.

A new RS may be added to the afore-described currently defined DRS. In addition to the currently defined DRS, RS resources may be allocated for a CoMP RS. If each CoMP cell transmits CoMP RSs using a plurality of antennas, more RSs may be allocated according to the number of antennas in each cell.

Figure 12:
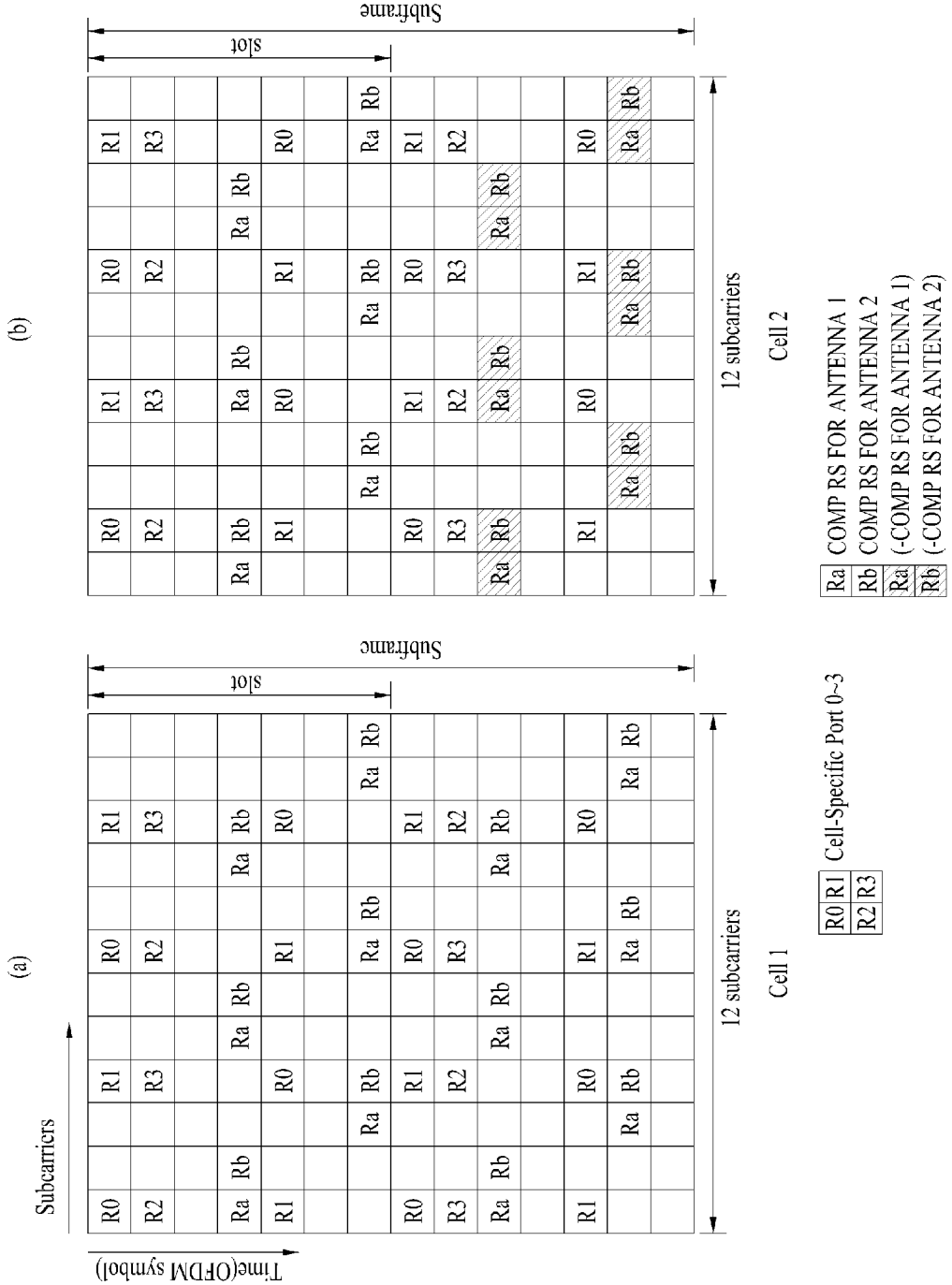
FIG. 12 illustrates exemplary reference signal patterns of allocating multi-antenna CoMP reference signals using reference signal extension and code resources in two cells each having two transmission antennas.

FIG. 12 illustrates exemplary RS patterns of allocating multi-antenna CoMP RSs using RS extension and code resources in two cells each having two transmission antennas.

Referring to FIG. 12, one subframe may be divided into two slots each including 7 OFDM symbols. When each cell uses more antennas, it may allocate additional RS resources or may allocate RS resources for added antennas through time-domain extension. The illustrated case of FIG. 12 corresponds to additional allocation of RS resources.

Cell 1 may allocate a CoMP RS for a first antenna, and then may allocate a CoMP RS for a second antenna by allocating additional RS resources so that the CoMP RS for the second antenna is adjacent to the CoMP RS for the first antenna. The CoMP RSs for the first and second antennas may be allocated not to be overlapped with CRSs.

Cell 2 may allocate CoMP RSs for a plurality of antennas in the same manner as cell 1. The CoMP RSs of cell 1 and cell 2 may be allocated at the same positions. CRSs for cell-specific ports 0 to 3 may be allocated not to be overlapped between cell 1 and cell 2.

Figure 13:
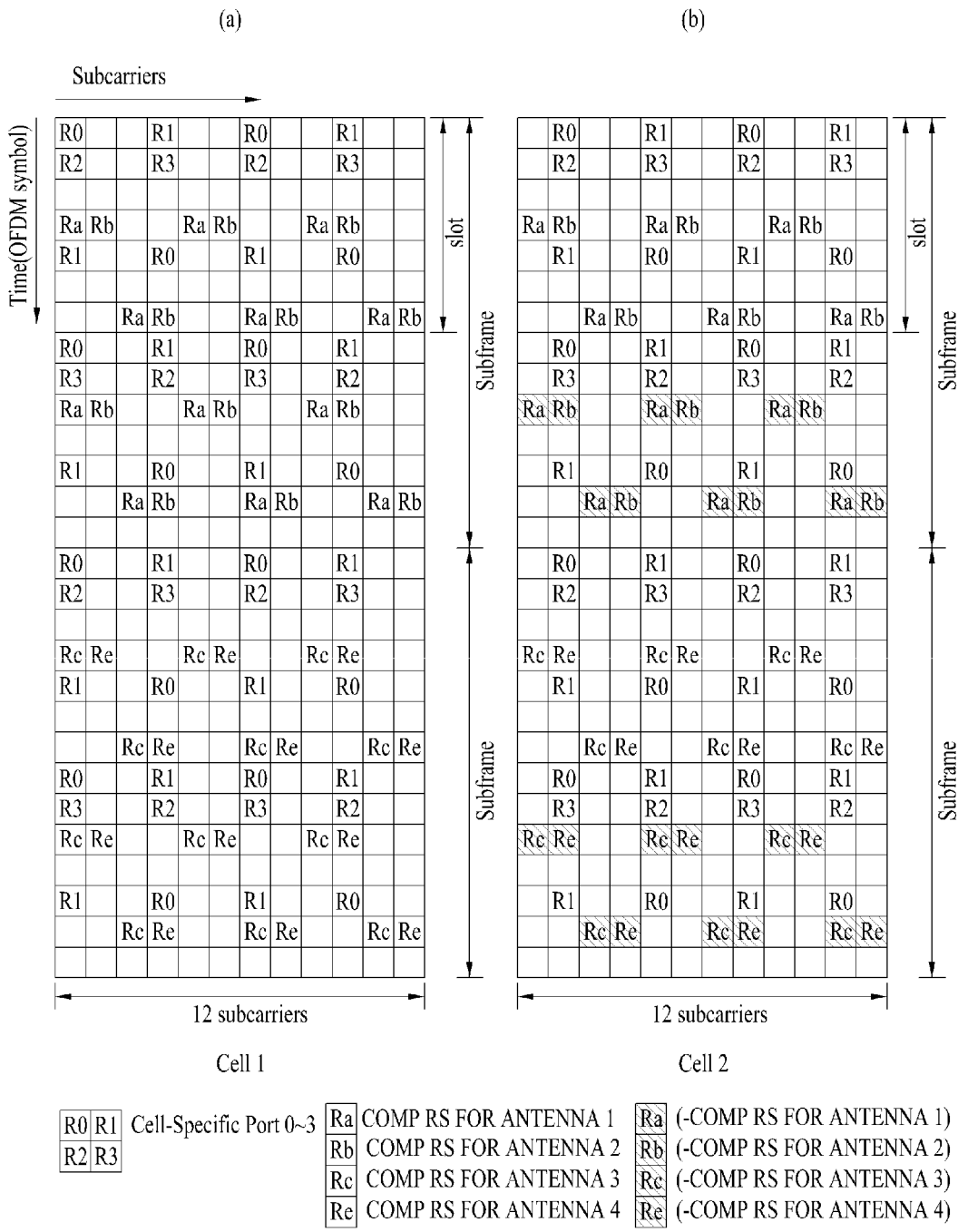
FIGS. 13 and 14 illustrate exemplary reference signal patterns of allocating multi-antenna CoMP reference signals using reference signal extension and code resources in two cells each having four transmission (Tx) ends.

FIG. 13 illustrates exemplary RS patterns of allocating multi-antenna CoMP RSs using RS extension and code resources on a slot basis in two cells each having four transmission (Tx) ends.

Referring to FIG. 13, one subframe may be divided into two slots each having 7 OFDM symbols. Cell 1 and cell 2 may allocate RSs on a slot basis using code resources. In case of four antennas, RS resources for two antennas are doubled, while allocation of RS resources for the other two antennas is extended to a slot or a subframe. Herein, code resources may be used on a slot basis.

Cell 1 may allocate a CoMP RS, Ra for a first antenna and a CoMP RS, Rb for a second antenna at adjacent positions in a first slot of a first subframe. The CoMP RSs may be allocated in the same manner in the other slot of the first subframe. Similarly, cell 1 may allocate a CoMP RS, Rc for a third antenna and a CoMP RS, Rd for a fourth antenna may be allocated in each slot of a second subframe.

Cell 2 may allocate CoMP RSs for a plurality of antennas in the same manner as cell 1. The CoMP RSs of cell 1 and cell 2 may reside at the same positions. In case of cell-specific ports 0 to 3, CRSs may be allocated not to be overlapped between cell 1 and cell 2. In this manner, the CoMP RSs for the first to fourth antennas may be completely transmitted in two subframes.

Figure 14:
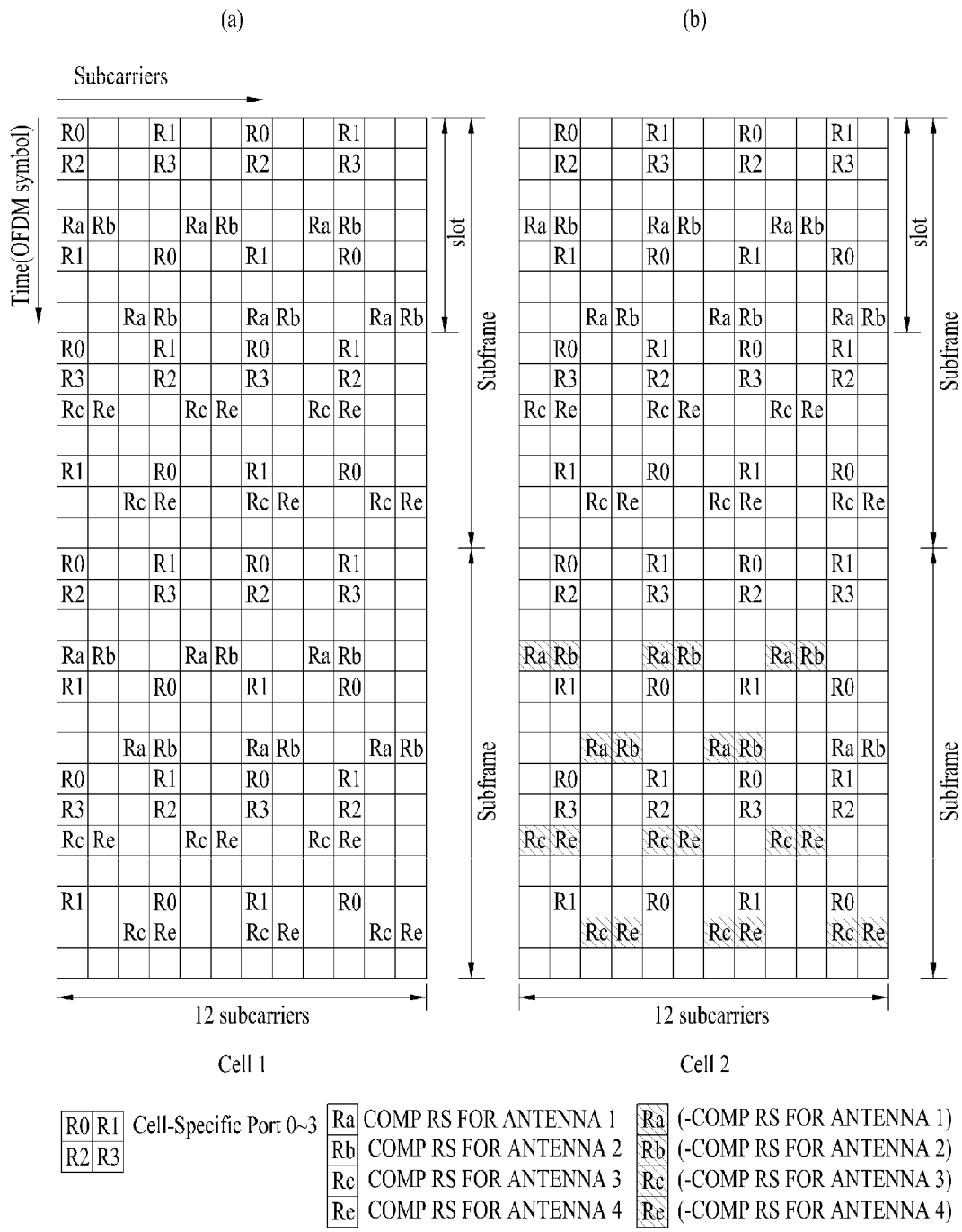

FIG. 14 illustrate exemplary RS patterns of allocating multi-antenna CoMP RSs using RS extension and code resources on a subframe basis in two cells each having four transmission (Tx) ends.

Referring to FIG. 14, one subframe may be divided into two slots each slot having 7 OFDM symbols, as in FIG. 13. Cell 1 and cell 2 may allocate RSs on a subframe basis using code resources. All CoMP RSs for four antennas are allocated to one subframe. Herein, code resources may be used on a subframe basis.

Cell 1 may allocate a CoMP RS, Ra for a first antenna and a CoMP RS, Rb for a second antenna at adjacent positions in a first slot of a first subframe. Cell 1 may also allocate a CoMP RS, Rc for a third antenna and a CoMP RS, Rd for a fourth antenna at adjacent positions in the other slot of the first subframe, in the same manner as in the first slot. Likewise, cell 1 may allocate the CoMP RSs for the antennas in a second subframe.

Cell 2 may allocate CoMP RSs for a plurality of antennas in the same manner as cell 1. Notably, CRSs (cell-specific ports 0 to 3) may be allocated not to be overlapped between cell 1 and cell 2. In this manner, the CoMP RSs for the first to fourth antennas may be completely transmitted in one subframe.

Compared to FIGS. 10 and 11, FIGS. 12 and 13 describe a case where each cell allocates additional RS resources or allocates RS resources by extending a time region, as described above. When CoMP RSs are transmitted through RS resource extension, the time taken to transmit the CoMP RSs is shortened but data efficiency is decreased, relative to a non-RS resource extension pattern.

Meanwhile, a plurality of CoMP cells may transmit CoMP RSs along the frequency axis as well as along the time axis. That is, CoMP RSs may be transmitted using code resources on an RB basis or on a subcarrier basis along the frequency axis within the same slot or symbol, for estimation of channels from the cells. As the number of CoMP cells increases, code resources are generated accordingly and allocated to the CoMP cells. Thus, channel estimation is possible in the multi-cell environment.

4. CDM Through Grouping

CoMP cells may be grouped and CoMP RSs may be allocated using orthogonal code resources according to the groups. That is, the positions of DRSs may be differentiated for the groups or CoMP RSs of the groups may be allocated to different time and frequency regions. The allocation of multi-cell CoMP RSs through cell grouping advantageously enables efficient allocation and transmission of RSs for more CoMP cells.

A case in which four cells each having two transmission antennas are grouped into two groups and allocate CoMP RSs according to the grouping is considered.

Figure 15:
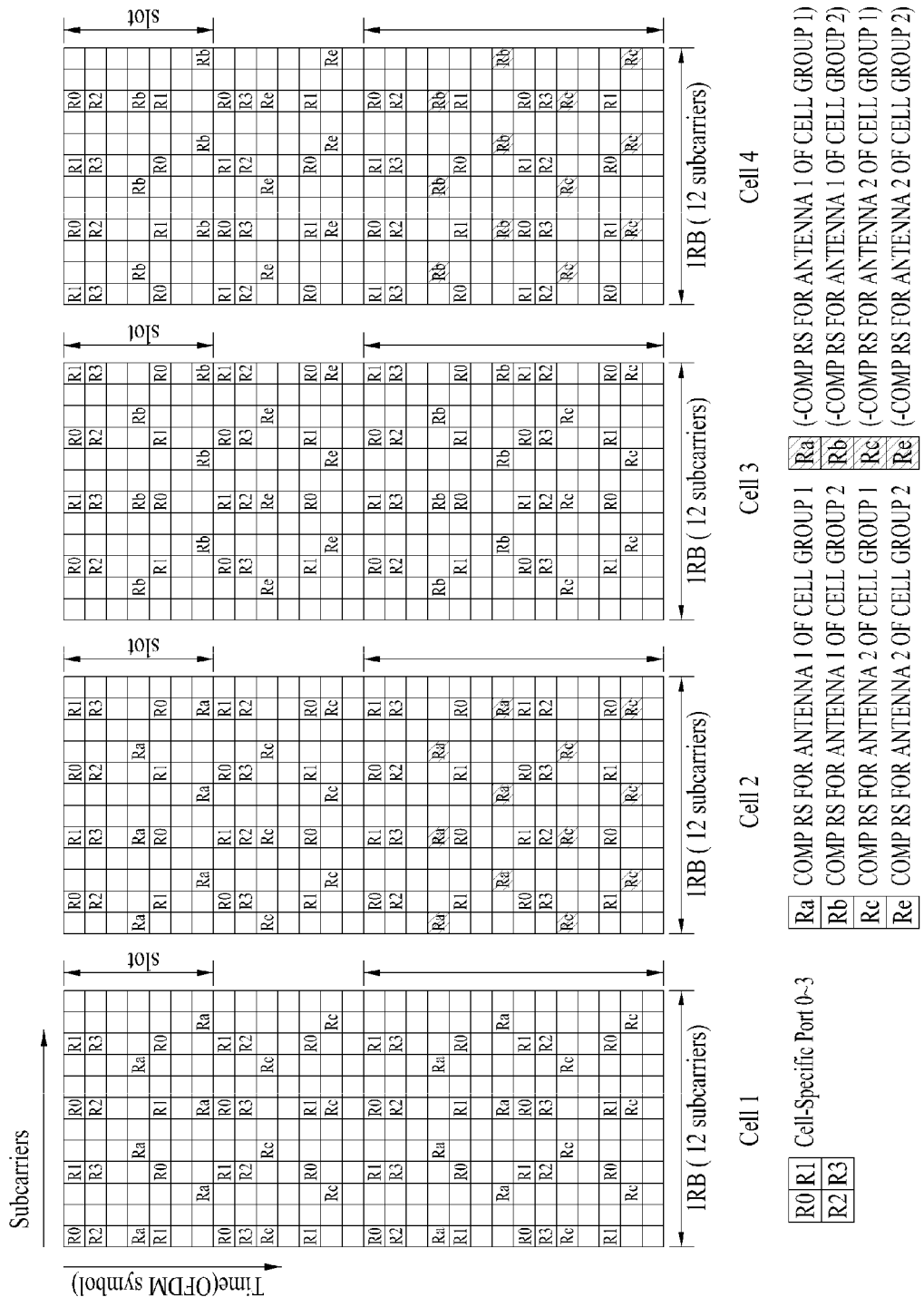
FIG. 15 illustrates exemplary reference signal patterns of allocating multi-antenna CoMP reference signals using grouping and code resources in four cells each having two transmission antennas, grouped into two groups.

FIG. 15 illustrates exemplary RS patterns of allocating multi-antenna CoMP RSs using grouping and code resources in four cells each having two transmission antennas, grouped into two groups.

Referring to FIG. 15, one slot may include 7 OFDM symbols and orthogonal code resources may be applied to cells within each group. Each group may transmit CoMP RSs by allocating DRSs to the same time and frequency region. Each cell of each group may allocate a CoMP RS corresponding to each antenna on a slot or symbol basis. In a first cell group, if a CoMP RS for a first antenna is allocated to a first slot, a CoMP RS for a second antenna may be allocated to a second slot. In this manner, multi-antenna RSs may be allocated for CoMP and then CoMP RSs may be allocated using code resources.

According to the matrix of Equation 1, a serving cell of a first cell group, cell 1 may be allocated code resources 1 and a neighbor cell, cell 2 may be allocated code 2. Each cell may transmit RSs along the time or frequency axis based on its allocated code resources. Herein, RSs are transmitted along the time axis, by way of example. Cell group 1 may include cell 1 and cell 2 and cell group 2 may include cell 3 and cell 4.

Cell 1 to which code 1 has been allocated may allocate CoMP RSs, Ra and Rc for the first and second antennas of cell group 1 to the respective slots of a first subframe, in correspondence with a code resource element 1 and may allocate the CoMP RSs, Ra and Rc for the first and second antennas of cell group 1 to the respective slots of a second subframe, in correspondence with the other code resource element 1. Cell 2 to which code 2 has been allocated may allocate the CoMP RSs Ra and Rc for the first and second antennas of cell group 1 to the respective slots of the first subframe, in correspondence with a code resource element 1 and may allocate CoMP RSs −Ra and −Rc for the first and second antennas of cell group 1 to the respective slots of the second subframe, in correspondence with the other code resource element −1.

Cell 3 of cell group 2 may allocate CoMP RSs Rb and Re corresponding to first and second antennas of cell group 2 to different time and frequency regions from those of cell group 1 using code resources 1 in the first and second subframes. Like cell 3, a neighbor cell, cell 4 may allocate CoMP RSs −Rb and −Re corresponding to the first and second antennas of cell group 2 to different time and frequency regions from those of cell group 1 using code resources 2 in the first and second subframes.

CRSs (cell-specific ports 0 to 3) may be allocated not to be overlapped between cell 1 and cell 2 and between cell 3 and cell 4. A DRS may be mapped according to the length of an RS sequence allocated to one RB or one symbol.

Cell groups may be formed such that they have the same number or different numbers of CoMP cells. That is, as illustrated in FIG. 15, given four CoMP cells, they are paired and thus grouped into two groups. Or the four CoMP cells may be grouped into one group of a serving cell and another group of the other three neighbor cells. CoMP cell grouping may vary depending on a situation.

As another example, it may be contemplated that two CoMP cells (cell 1 and cell 2) out of four CoMP cells perform soft combining by jointly transmitting the same data and the other two CoMP cells (cell 3 and cell 4) are in a CoMP scenario (e.g. transmit diversity, SM, etc.) other than soft combining. In this case, RSs from cell 1 and cell 2 may be regarded as a single RS using the same sequence, allocated to the same time and frequency region. Therefore, the same CoMP RS as used when a cell performs a CoMP operation may be allocated.

That is, the first group for soft combining and the other two neighbor cells may allocate CoMP RSs using mutually orthogonal code resources, or a group of the other two neighbor cells may allocate CoMP RSs distinguishably from CoMP RSs of the first group for soft combining. In addition, if the second group of cell 3 and cell 4 performs soft combining separately from the first group, the first and second groups may allocate CoMP RSs using two orthogonal code resources in the same manner as two cells perform a CoMP operation.

Joint processing is a cooperative MIMO scheme in which CoMP cells share data. When a plurality of cells perform joint processing, a resource zone carrying data and RSs for a CoMP operation may be allocated dedicated. When a CoMP resource zone is dedicated, there is no need for allocating CoMP RSs to resources outside the CoMP resource zone. That is, CoMP cells do not need to allocate their CoMP RSs at the same positions and the resources at the positions can be used freely for RSs serving a different purpose or data. Thus, resources can be efficiently utilized.

The CoMP resource zone may be allocated semi-statically by higher layer signaling. The same or different Physical Resource Blocks (PRBs) may be allocated to CoMP resource zones for CoMP cells. If the CoMP resource zones occupy the same PRBs for the CoMP cells, the UE may accurately estimate channels from the different cells using CoMP RSs based on code resources. In this case, the UE has only to know information about PRBs of the CoMP resource zone of its serving cell. On the other hand, if the CoMP resource zones have different PRBs for the different CoMP cells, the UE may effectively estimate channels from the different cells without an additional transmission scheme for CoMP RSs. However, the UE should receive information about the positions of PRBs for the CoMP resource zones of the neighbor CoMP cells from the serving cell.

As described above, the present invention pertains to allocation and transmission of RSs of multiple CoMP cells. The present invention is useful especially for multi-cell joint processing. In addition, the technology of the present invention is applicable to RS transmission for single-cell high-order MIMO as well as RS transmission in a multi-cell environment.

That is, it is possible to map each of multiple CoMP cells to a single-cell antenna port, for transmission. For example, when four cells transmit CoMP RSs through one virtual antenna in FIG. 5, this may correspond to a case where four antennas transmit data with rank 4. Similarly, when two cells transmit CoMP RSs through two virtual antennas in FIG. 10, this may correspond to a case where four antennas transmit data with rank 4 in a single cell. In addition, FIG. 11 may correspond to a case where eight antennas transmit data with rank 8 in a single cell.

The above-described CoMP RS patterns of the present invention are useful for LTE-A UEs. For backward compatibility with legacy LTE UEs, an LTE-A subframe may be defined. That is, the CoMP RS patterns of the present invention are useful for a subframe defined as an LTE-A subframe.

While CoMP RSs have been described so far mainly in terms of DRSs for demodulation in the present invention, the same description applies to CRSs for measurement of channel estates, etc. For the convenience' sake of description, RS structures that map CoMP RSs to the same positions in a plurality of cells have been taken as examples. Yet, an RS pattern designed for each cell through frequency shifting or time shifting may reduce inter-cell interference between RSs.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is also obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. that performs the above-described functions or operations. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The method for transmitting and receiving CoMP RSs in a multi-cell environment according to the present invention can be utilized in a variety of industrial fields.

The invention claimed is:

1. A method for receiving CoMP RSs (Cooperative Multi-Point Reference Signals) from CoMP cells at a user equipment (UE) in a multi-cell environment, the method comprising:
receiving, from the CoMP cells transmitting a same data jointly, reference signals comprising Common Reference Signals (CRSs) and the CoMP RSs, wherein orthogonal codes are applied to the CoMP RSs for mutual orthogonality among the CoMP RSs; and
processing the received CoMP RSs using the orthogonal codes applied by distinguishing the CoMP cells from one another,
wherein the orthogonal codes are applied to the CoMP RSs on a slot unit or on a symbol unit, and
wherein whether to apply the orthogonal codes on the slot unit or on the symbol unit is determined based on a speed of the UE in the CoMP cells, and
wherein positions of the CoMP RSs are fixed among the CoMP cells while positions of the CRSs are variable among the CoMP cells.

2. The method according to claim 1, wherein each of orthogonal code resource elements (REs) corresponding to the CoMP RSs is applied on the slot unit in a resource block (RB) when the UE moves relatively slow in the CoMP cells.

3. The method according to claim 1, wherein each of orthogonal code resource elements (REs) corresponding to the CoMP RSs is applied on the symbol unit in a resource block when the UE moves relatively fast in the CoMP cells.

4. The method according to claim 1, wherein the UE receives information about orthogonal code resources used by the CoMP cells from a serving cell through a broadcasting channel or by higher layer signaling.

5. The method according to claim 1, wherein first orthogonal code resource elements (REs) corresponding to first and second antennas of the CoMP cells are applied on the slot unit in a first subframe and second orthogonal code resource elements corresponding to third and fourth antennas of the CoMP cells are applied on the slot unit in a second subframe.

6. The method according to claim 1, wherein first orthogonal code resource elements (REs) corresponding to first and second antennas of the CoMP cells are included in the same slot of a first subframe and applied on the slot unit and second orthogonal code resource elements (REs) corresponding to third and fourth antennas of the CoMP cells are included in the same slot of a second subframe and applied on the slot unit.

7. The method according to claim 1, wherein first orthogonal code resource elements (REs) corresponding to first and second antennas of the CoMP cells are applied to a first slot of a first subframe and second orthogonal code resource elements (REs) corresponding to third and fourth antennas of the CoMP cells are applied to a second slot of the first subframe.

8. A method for transmitting a CoMP RS (Cooperative Multi-Point Reference Signal) at a CoMP base station in a multi-cell environment, the method comprising:
allocating orthogonal code resources to which orthogonal codes are applied for mutual orthogonality among CoMP RSs of each of CoMP base stations; and
transmitting a reference signal comprising a Common Reference Signal (CRS) and the CoMP RS using the orthogonal code resources, wherein the orthogonal codes are applied to the CoMP RS for mutual orthogonality among the CoMP RSs of the CoMP base stations,
wherein the orthogonal codes are applied to the CoMP RSs on a slot unit or on a symbol unit,
wherein whether to apply the orthogonal codes on the slot unit or on the symbol unit is determined based on a speed of the UE in the CoMP cells, and
wherein positions of the CoMP RSs are fixed among the CoMP cells while positions of the CRSs are variable among the CoMP cells.

* * * * *